US009438891B2

(12) United States Patent
Mannion et al.

(10) Patent No.: US 9,438,891 B2
(45) Date of Patent: Sep. 6, 2016

(54) HOLOCAM SYSTEMS AND METHODS

(71) Applicant: Seiko Epson Corporation, Tokyo (JP)

(72) Inventors: Michael Mannion, Newmarket (CA); Sujay Sukumaran, Ajax (CA); Ivo Moravec, Richmond Hill (CA); Syed Alimul Huda, Scarborough (CA); Bogdan Matei, Ajax (CA); Arash Abadpour, Toronto (CA); Irina Kezele, Richmond Hill (CA)

(73) Assignee: Seiko Epson Corporation, Tokyo (JP)

( * ) Notice: Subject to any disclaimer, the term of this patent is extended or adjusted under 35 U.S.C. 154(b) by 306 days.

(21) Appl. No.: 14/208,368

(22) Filed: Mar. 13, 2014

(65) Prior Publication Data
US 2015/0261184 A1 Sep. 17, 2015

(51) Int. Cl.
*H04N 13/02* (2006.01)
*G06T 17/00* (2006.01)

(52) U.S. Cl.
CPC ........... *H04N 13/0275* (2013.01); *G06T 17/00* (2013.01); *G06T 2210/56* (2013.01); *H04N 2213/003* (2013.01)

(58) Field of Classification Search
USPC .......................................................... 348/41
See application file for complete search history.

(56) References Cited

U.S. PATENT DOCUMENTS

| 5,988,862 | A * | 11/1999 | Kacyra | G01B 11/002 382/195 |
| 6,705,526 | B1 * | 3/2004 | Zhu | B82Y 15/00 235/462.01 |
| 6,864,903 | B2 | 3/2005 | Suzuki | |
| 7,551,771 | B2 * | 6/2009 | England, III | G01C 3/08 382/154 |
| 2003/0132935 | A1 * | 7/2003 | Ellenby | G06T 15/20 345/419 |
| 2005/0057569 | A1 * | 3/2005 | Berger | G06T 13/40 345/473 |
| 2006/0098089 | A1 * | 5/2006 | Sofer | A61H 3/061 348/62 |
| 2006/0193521 | A1 * | 8/2006 | England | G01S 7/51 382/190 |
| 2010/0302247 | A1 * | 12/2010 | Perez | G06K 9/00201 345/440 |
| 2014/0192170 | A1 * | 7/2014 | Samadani | H04N 13/0402 348/51 |
| 2014/0225988 | A1 * | 8/2014 | Poropat | G01S 17/89 348/46 |
| 2016/0006951 | A1 * | 1/2016 | Moghadam | G03B 35/02 348/164 |

OTHER PUBLICATIONS

Salman, N., et al., "High Resolution Surface Reconstruction from Overlapping Multiple-Views", SCG '09, Jun. 8-10, 2009. ACM 978-1-60558-501-7/09/06.
Merrell, P., et al., "Real-Time Visibility-Based Fusion of Depth Maps", IEEE 11th International Conference on Computer Vision, ICCV, 2007.
Ernst, F.E., et al., "Efficient generation of 3-D models out of depth maps", VMV 2001, Stuttgart, Germany, Nov. 21-23, 2001.
(Continued)

*Primary Examiner* — Paulos M Natnael

(57) ABSTRACT

Aspects of the present invention comprise holocam systems and methods that enable the capture and streaming of scenes. In embodiments, multiple image capture devices, which may be referred to as "orbs," are used to capture images of a scene from different vantage points or frames of reference. In embodiments, each orb captures three-dimensional (3D) information, which is preferably in the form of a depth map and visible images (such as stereo image pairs and regular images). Aspects of the present invention also include mechanisms by which data captured by two or more orbs may be combined to create one composite 3D model of the scene. A viewer may then, in embodiments, use the 3D model to generate a view from a different frame of reference than was originally created by any single orb.

20 Claims, 23 Drawing Sheets

(56) References Cited

OTHER PUBLICATIONS

Lou, R., et al., "Direct Merging of Triangle Meshes Preserving Simulation Semantics for Fast Modification of Numerical Models", Proceedings of TMCE 2008 Symposium, Apr. 21-25, 2008.

Fua, P., "Combining Stereo and Monocular Information to Compute Dense Depth Maps that Preserve Depth Discontinuities", IJCAI'91, Proceedings of the 12th International Joint Conference on Artificial Intelligence, vol. 2, pp. 1292-1298, 1991.

Rotenberg, Steve, "Texture Mapping." CSE167: Computer Graphics Instructor, Fall (2005).

* cited by examiner

900

905 — Find a point that has been zero in one or more consecutive frames (e.g., $frame_0$ and $frame_{-1}$) and non-zero in one or more consecutive frames (e.g., $frame_{-2}$, $frame_{-3}$, and $frame_{-4}$) -- this point is considered to correspond to the point acquisition device 910 — When such a point is detected, a binary mask of all zero pixels in one of the frames with zero value(s) (e.g., $frame_0$) is calculated and a center of mass of the zero region is calculated and the corresponding point is identified as (x,y), where (x,y) represent the pixel indices of the depth map 915 — Calculate an average (e.g., mean, median, or mode) depth value, Z, within a neighborhood of the center of mass point (x,y) in depth map of one of the prior non-zero frames (e.g., $frame_{-3}$)

920 — Calculate the real world X and Y coordinates for this point

| | | | | | |
|---|---|---|---|---|---|
| Before ICP | | 264.24 | | | |
| 1 | 46.38% | 264.24 | 0 | 0.00% | |
| 2 | 47.85% | 231.93 | 32.31 | 13.93% | |
| 3 | 48.27% | 226.73 | 37.51 | 16.54% | |
| 4 | 48.21% | 226.75 | 37.49 | 16.53% | |
| 5 | 47.97% | 225.69 | 38.55 | 17.08% | |
| 6 | 48.10% | 224.61 | 39.63 | 17.64% | |
| 7 | 48.05% | 224.78 | 39.46 | 17.55% | |

FIGURE 18

HOLOCAM SYSTEMS AND METHODS

BACKGROUND

1. Field of Invention

The present patent document is directed towards systems and methods for capturing a scene, displaying a scene, or both. More particularly, the present patent document is directed towards systems and methods for capturing a scene using video or still images and generating a three-dimensional representation of the scene, which may then be displayed from different viewing angles.

2. Description of the Related Art

At the moment that a picture or a video is taken by a conventional image capture device, such as a camera, the viewpoint is fixed to a particular point in the space. Thus, conventional cameras do not allow for changing the viewpoint after the picture or the video has been taken. This fixed viewpoint is due, in part, to the type of data acquired by these cameras. Specifically, traditional cameras acquire a matrix of color components of a scene. Another contributing factor is that conventional cameras capture the scene from one, and only one, vantage point. That is, the matrix of color component represents the scene as it appears from the vantage point of the camera. Because the camera only has a representation from a single vantage point, a viewer is limited to that view.

Various approaches, such as three-dimensional (3D) video or free viewpoint video, have attempted to represent scene in a three-dimensional manner. These approaches range from approaches that have full knowledge of the scene geometry (geometry-based approaches) to image-based approaches that do not use 3D geometry. With all of these approaches, however, there are notable drawback and limitations.

Accordingly, what is needed are novel systems and methodologies that allow for generation of a three-dimensional representation of a scene and that allow a user to select an arbitrary vantage point from which to view the scene.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the scope of the invention to these particular embodiments.

FIGS. 8 and 9 present aspects of user-assisted scene registration according to embodiments of the present invention.

FIG. 18 provides a table summary of numerical results of the example in FIG. 17 according to embodiments of the present invention.

DESCRIPTION OF THE PREFERRED EMBODIMENTS

Figure 1:
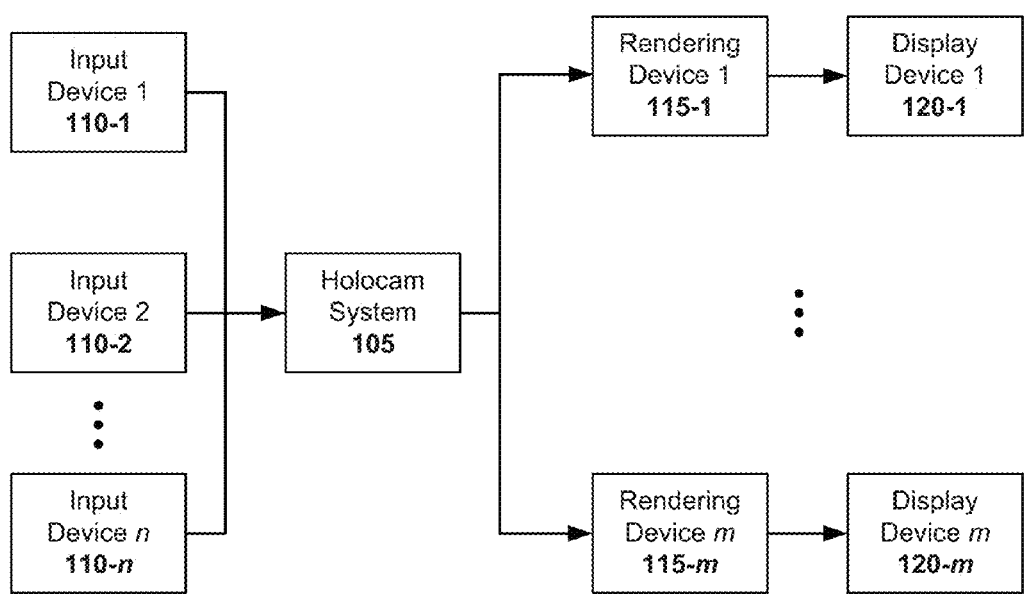
FIG. 1 displays a holocam system from an input/output perspective according to embodiments of the present invention.

In the following description, for purposes of explanation, specific details are set forth in order to provide an understanding of the invention. It will be apparent, however, to one skilled in the art that the invention may be practiced without these details. Furthermore, one skilled in the art will recognize that embodiments of the present invention, described herein, may be implemented in a variety of ways, including software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should also be noted that functions or operations discussed herein may be implemented as components or modules.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, such phrases in various places in the specification are not necessarily all referring to the same embodiment or embodiments. It shall be noted that the use of the terms "set" and "group" in this patent document shall include any number of elements. While the terms depth (distance from a plane), distance (radial distance from a sensor), and range may have slightly different meanings, these terms may be used interchangeably herein.

It shall also be noted that methods or algorithms steps may not be limited to the specific order set forth herein; rather, one skilled in the art shall recognize that certain steps may be performed in different orders, including being done contemporaneously.

It shall be noted that although embodiments described herein may be within the context of images (still or video), the invention elements of the current patent document are not so limited. Accordingly, aspects of the invention elements may be applied or adapted for use in other contexts and/or on other input sensor data.

1. Introduction & Overview

There are a number of depth sensors available in the market. These sensors utilize different methods in order to acquire a matrix of measurements from a scene, where each element denotes the distance of the corresponding point from the sensor. Available depth sensors are generally classified into active and passive.

Within each class of sensors there are sub-classes as well. For example, Time of Flight (TOF) and Structured Light are examples of active methods. Lightfield and Stereo approaches are examples of passive methods. The means of depth measurement utilized in any method also mandates the requirements and the limitations for the corresponding sensor. For example, TOF sensors have limited range and may not work under certain conditions, such as, exposure to very bright sunlight.

Moreover, acquisition of depth data using one sensor is generally not enough. Depth sensors have a limited field of view (FOV) and generally operate under line-of-sight assumptions. Therefore, the combination of the data acquired using a number of sensors (or a sensor at a number of locations) is a major requirement for being able to reconstruct the three-dimensional (3D) content of a scene, as opposed to acquiring the range profile of the scene from one vantage point.

Acquisition of the depth data is, in fact, the producer of content for a larger system which has to have appropriate means for transferring the acquired data and presenting it for the consumer side. This requires proper encoding of the multiplicity of range information acquired of the scene in combination with the corresponding visible images. The encoded data should be transmitted in a fashion possible on conventional communication lines and then presented on a display system as directed by a user.

Embodiments of the holocam system solve the problems listed above. As explained in more detail herein, a "holocam" system represents novel systems and novel methodologies that allow for capturing visual characteristics of a scene and for allowing a user to select arbitrary viewpoints based upon a generated model of the scene. The various embodiments enable the combination of range information and visible images acquired using different devices. In embodiments, these pieces of range information can be, and are encouraged to have been, captured using devices which utilize different depth data acquisition methods. In embodiments, holocam systems combine these data sources into single models of the scene and are capable of transmitting the data through a network to reach a display device.

Thus, embodiments of holocam systems can combine depth information and visible images acquired using different methods and from a number of different vantage points into a model created from the scene. And, embodiments of holocam systems can transfer a model created from the scene through a conventional network and provide the information needed for displaying the content from any perspective on a display system.

2. Embodiments of Holocam System

In embodiments, a holocam system is a content-creation system, which enables the real-time capture and streaming of real-world scenes. FIG. 1 displays a holocam system from an input/output perspective according to embodiments of the present invention.

As depicted in FIG. 1, the holocam system 105 receives input from one or more input devices 110-x. In embodiments, an input device may comprise an image capture device, such as a video or still image camera, combined with a depth measuring input device, such as a time of flight (TOF), structured light, lightfield, stereo sensors, or other depth measuring devices. For convenience, the combined image and depth measuring devices may be referred herein as an "orb." It shall be noted that, in embodiments, the holocam system 105 may receive input from the same orb located at different positions or from different orbs located at different positions. In any event, the holocam system 105 receives input data of a scene from a plurality of positions. The image color information (which shall be understood to include black and white as well as other color image information such as red, green, and blue (RGB)) as well as the depth information (D) are supplied to the holocam system 105. As will be described in more detail below, the holocam system takes the input data of the scene and generates a three-dimensional model. This model may be transmitted to one or more rendering devices 115-x that use the model data to render a view for display by a display device 120-x. In the depicted example, there is a rendering device for each display device; however, it shall be noted that one rendering device may provide display data to more than one display device.

Figure 2:
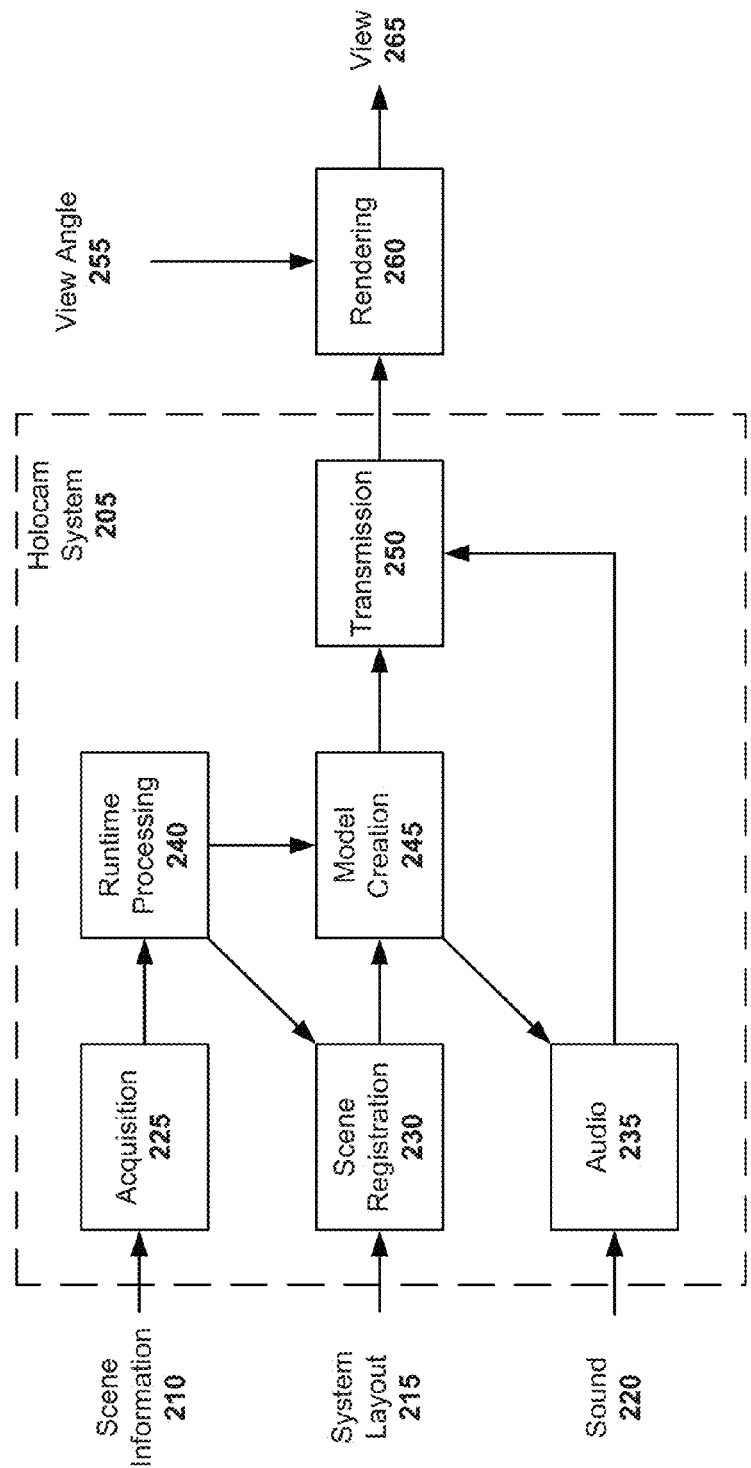
FIG. 2 depicts a holocam system and process flow according to embodiments of the present invention.

Turning now to FIG. 2, depicted is a holocam system 205 and process flow according to embodiments of the present invention. As shown in FIG. 2, the holocam system may comprise an acquisition module 225 that receives scene information 210 (e.g., visible image data and depth data (RGBD)) at different vantage points through utilizing one or more depth data acquisition devices and one or more visible image acquisition devices.

In embodiments, at least some of the scene data is supplied to a runtime processor 240 that is communicatively coupled to the acquisition module. In embodiments, the runtime processor filters the depth data, which tends to be rather noisy, according to one or more filtering operations. Some examples of filtering operations include, but are not limited to, anisotropic filters, bilateral filters, temporal averaging, and outlier removal; such filtering operations are well-known to those of ordinary skill in the art. In alternative embodiments, some or all of the filtering operations may be performed by the image/depth acquisition devices, the acquisition module, or both.

In embodiments, a holocam system may be configured to combine RGBD data through cross-correlating range data and visible image data to provide values for missing areas and verify segments which are captured in more than one source. In embodiments, a holocam system may perform resolution enhancement through joint processing of different data items at different resolutions.

In embodiments, a holocam system comprises a model creation module 245 that produces, for a vantage point, a three-dimensional (3D) model by combining depth data and visible image data from that vantage point. In embodiments, one of the representations utilized by a holocam system is a textured triangle mesh. In embodiments, the model creation module 245 also defines a source-independent canonical space which is used to register all vantage points into that space. To assist in such a model creation, a holocam system also comprises a scene registration module 230 that performs scene registration to acquire geometric transformations for merging two or more 3D models of the scene from different vantage points into the source-independent canonical space. The scene registration module 230 may also receive system layout information 215, which may include information about the physical layout of the system (e.g., horizontal axes of the depth devices are parallel or substantially parallel to the ground, locations of orbs in the scene, rigid body transforms between the orbs, etc.).

In embodiments, a holocam system may also comprise an audio module 235 that receives audio data 220 about the scene from one or more audio input devices.

As shown in FIG. 2, in embodiments, a holocam system 205 may include a transmission module 250 which encodes a scene model into a data stream for transmission over a network.

As depicted in the embodiment in FIG. 2, a model may be received by a rendering module 260 that receives as an input the scene model and a desired view angle 255 and renders a view 265 of the scene for that view angle 255 for display by one or more display devices. It shall be noted that, in embodiments, the rendering module 260 may be separate from a holocam system 205, part of a holocam system 205, or both.

Figure 3:
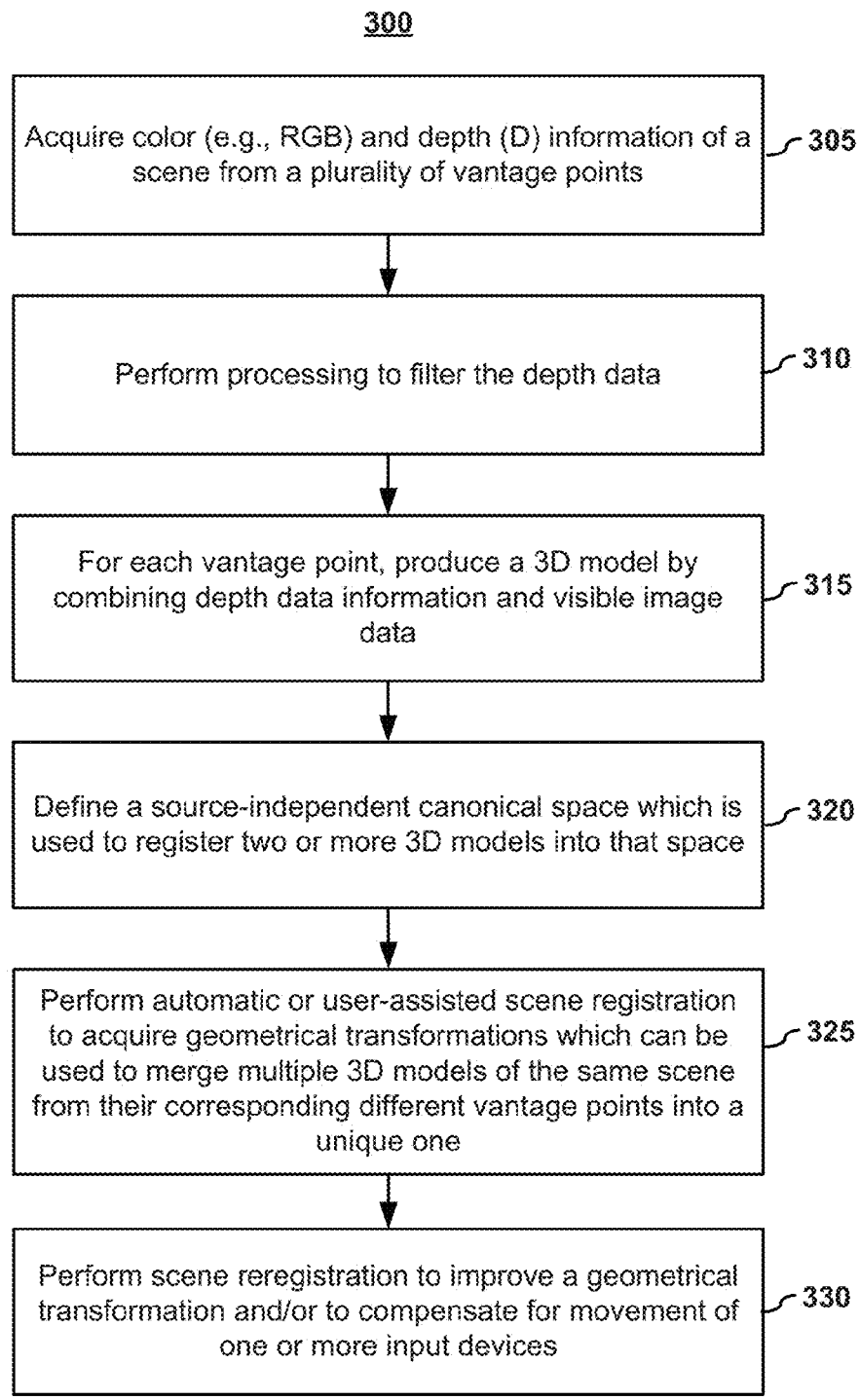
FIG. 3 depicts a method for generating a three-dimensional model of a scene that can be used for free viewpoint displaying according to embodiment of the present invention.

Turning now to FIG. 3, depicted is a method for generating a three-dimensional model of a scene that can be used for free viewpoint displaying according to embodiment of the present invention. In embodiments, the method of FIG. 3 may be performed by a holocam system, such as the one depicted in FIG. 2.

In embodiments, the method commences by a holocam system receiving (305) visual image/color data (e.g., RGB, grayscale, etc.) and depth (D) data of a scene from a plurality of vantage points. It shall be noted that color and depth information of the scene from the plurality of vantage points may be received from orbs at each of the plurality of vantage points or from one orb moved to different vantage points, although for generating a model for free viewpoint video rather than a still image, multiple orbs is preferred. Because depth data tends to be quite noisy, the holocam system may perform (310) one or more filtering operations on the depth data to make the data less noisy.

Figure 4A:
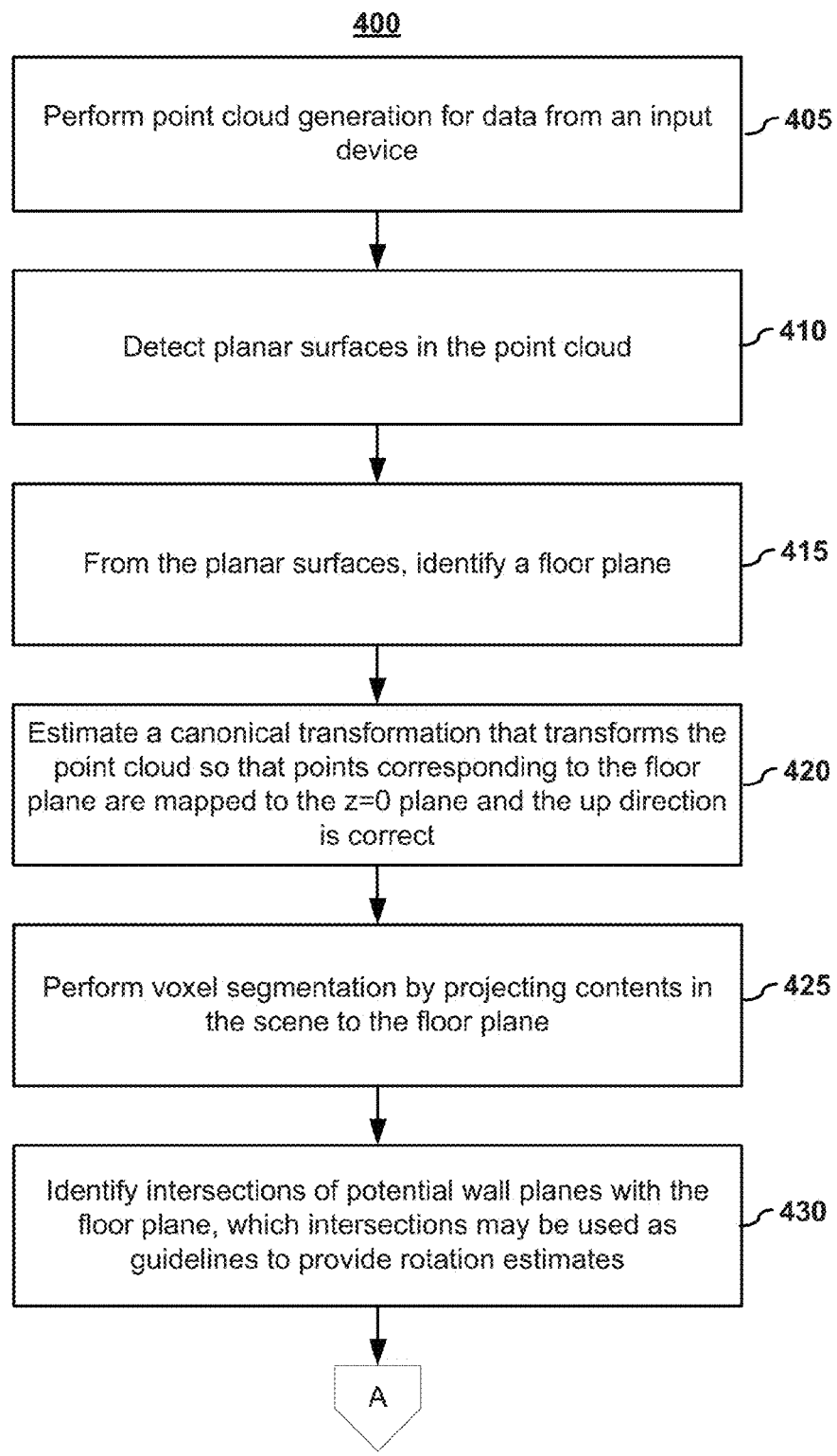
FIGS. 4A and 4B present automatic scene registration according to embodiments of the present invention.
Figure 4B:
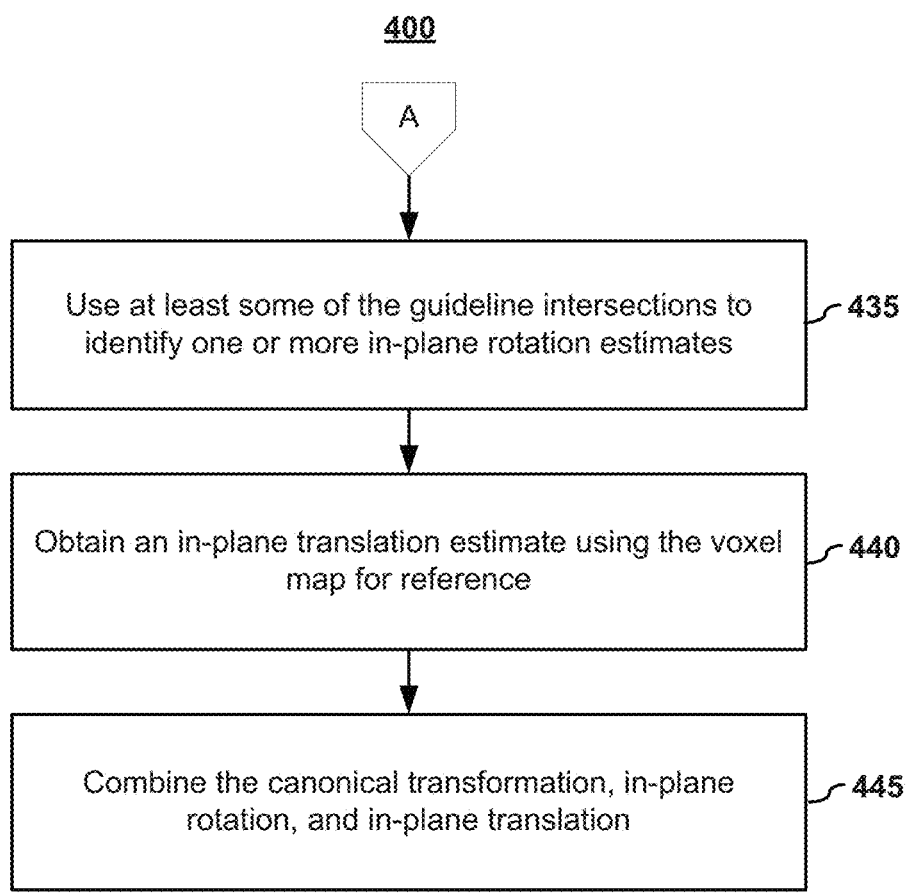
Figure 8:
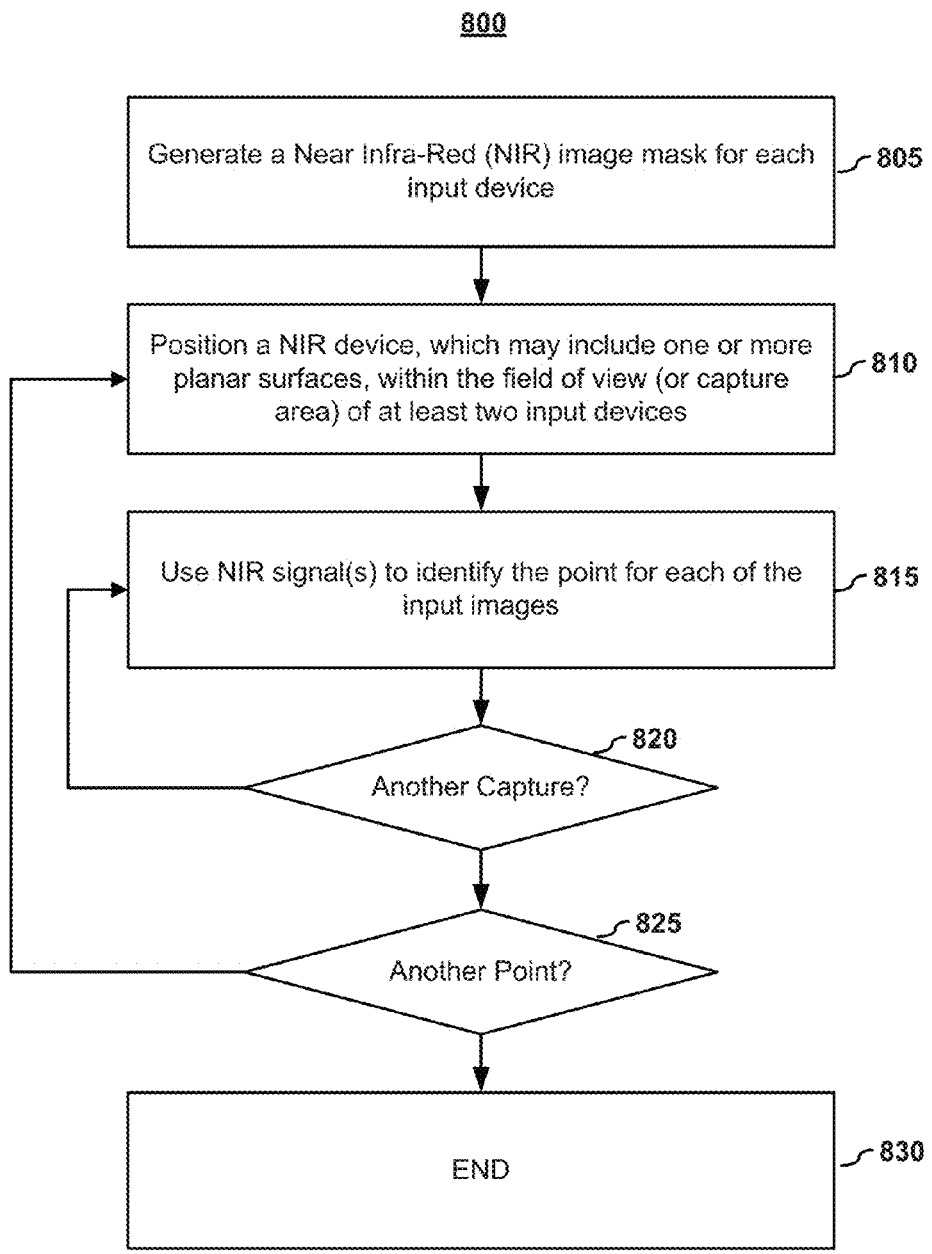

Having received the visible image and depth information, in embodiments, the holocam system produces (315), for each vantage point, a three-dimensional (3D) model of data by combining the depth data information and visible image data. To facilitate the combining of the various vantage points, the holocam defines (320) a source-independent canonical space which is used to register two or more of the 3D models into that space. Having defined the source-independent canonical space, scene registration is performed (325) to acquire the geometrical transformations which can be used to merge multiple 3D models of the same scene from their corresponding different vantage points into a unique one. In embodiments, the scene registration may be automatically performed, may be user assisted, or may be a combination thereof. FIGS. 4A and 4B present automatic scene registration according to embodiments of the present invention. FIGS. 8 and 9 present aspects of user-assisted scene registration according to embodiments of the present invention.

Returning to FIG. 3, in embodiments, the holocam system may perform (330) scene reregistration. As explained in more detail below, scene reregistration may be performed to improve the transformation into the canonical space, to compensate for movement of one or more orbs, or both.

3. Automatic Scene Registration

FIGS. 4A and 4B depict automatic scene registration according to embodiments of the present invention.

a. Point Cloud Generation

In embodiments, the method commences by performing (405) point cloud generation for data from an input orb. Given the intrinsic camera parameters (e.g., camera center and focal length values ($c_x$, $c_y$, $f_x$, and $f_y$) and distortion coefficients (k1, k2, k3, p1, and p2)) and the depth measurements (i, j, depth) of the depth map of the scene (where (i, j) represents a sensor or pixel location and "depth" represents its corresponding depth value), the points in the sensor plane can be converted to real world coordinates (X, Y, Z). Converting between sensor values and real world coordinates to form a point cloud is well known to those of ordinary skill in the art.

b. Plane Detection

In embodiments, the next step involves detecting (410) planar surfaces in the point cloud. Plane detecting may be performed according to the following methodology. First, tiles (e.g., 10 pixels×10 pixels) are cut from the point cloud. In embodiments, the tiles may be formed by starting in one portion and moving systematically through all the points. When generating the tiles, adjacent tiles may overlap by a set percentage (e.g., 80% overlap) or a set number of pixels (e.g., 2 pixel separation between tiles when generating tiles).

In embodiments, the points of each tile are fitted to a plane model (e.g., ax+by+z+d=0). For each tile, deviation of points from the modeled plane are calculated (e.g., E=error), and tiles with deviation below a threshold value (e.g., less than a hundredth of the range of the sensor) are picked. In embodiments, adjacent tiles, and/or portions thereof, are examined to determine whether they can be combined. Combinations that have a deviation below a threshold (e.g., less than a hundredth of the range of the sensor) may be joined together.

c. Floor Identification

Figure 5:
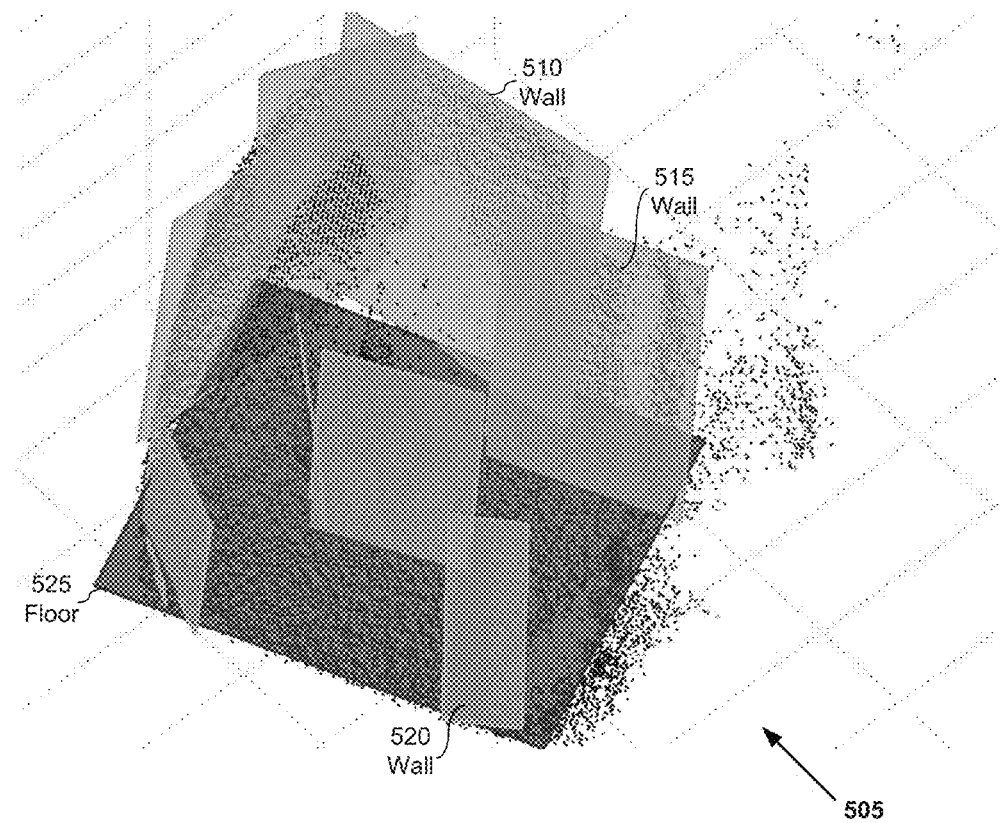
FIG. 5 depicts an example of a point cloud in which a number of planar surfaces have been identified and a floor plane has been identified according to embodiments of the present invention.

Having identified one or more sets of points that form planar surfaces, these planes may be examined to identify a floor plane. In embodiments, the floor may be identified by selecting planes with a large number of pixels. Also, given the system layout information (e.g., 215) in which the depth input device may be known to have its axis oriented parallel with the floor, these large planes may be examined to ascertain which of the planes needs little to no lateral rotation. FIG. 5 depicts an example of a point cloud 505 in which a number of planar surfaces have been identified (e.g., wall elements 510, 515, and 520) and a floor plane (e.g., floor 525) has been identified. Note that the floor plane comprises a large number of points and of the identified planes requires the least rotation to conform to an expected floor orientation.

d. Canonical Transformation Estimation

Having identified the floor plane, a canonical transformation is estimated (420) that transforms the point cloud so that points corresponding to the floor plane are mapped to the z=0 plane and the up direction is correct.

e. Voxel Segmentation

Figure 6:
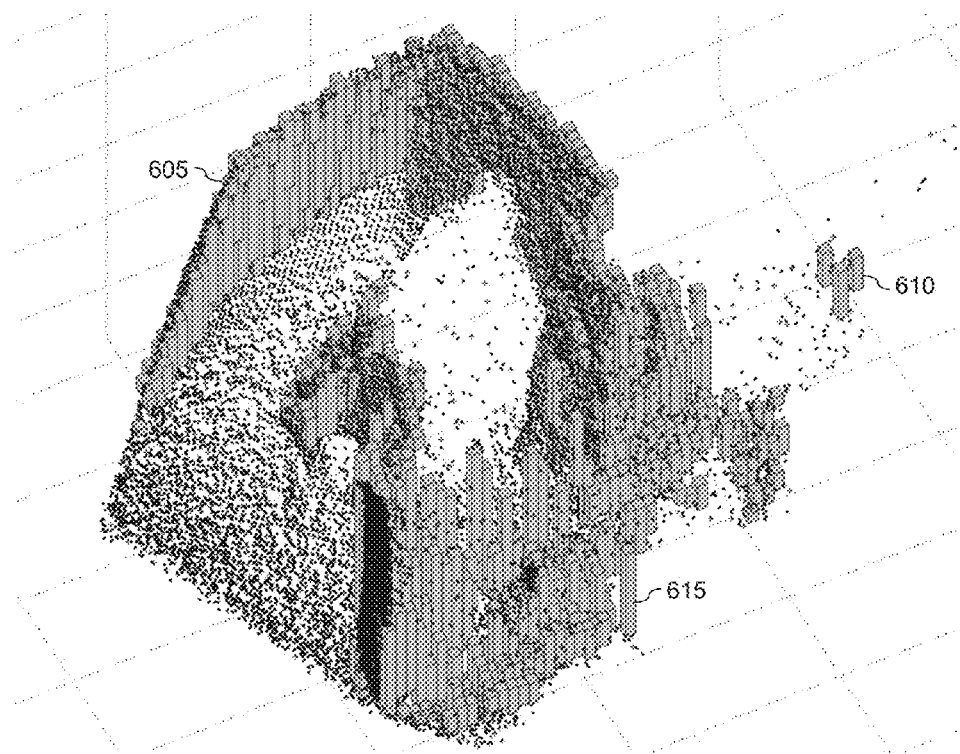
FIG. 6 graphically depicts an example of voxel segmentation of the point cloud depicted in FIG. 5 according to embodiments of the present invention.

In embodiments, voxel segmentation is performed (425) by projecting contents in the scene to the floor plane. FIG. 6 graphically depicts an example of voxel segmentation, according to embodiments of the present invention, of the point cloud depicted in FIG. 5. Note that several voxels (e.g., 605, 610, 615, etc.) have been formed.

f. Guideline Detection

Figure 7:
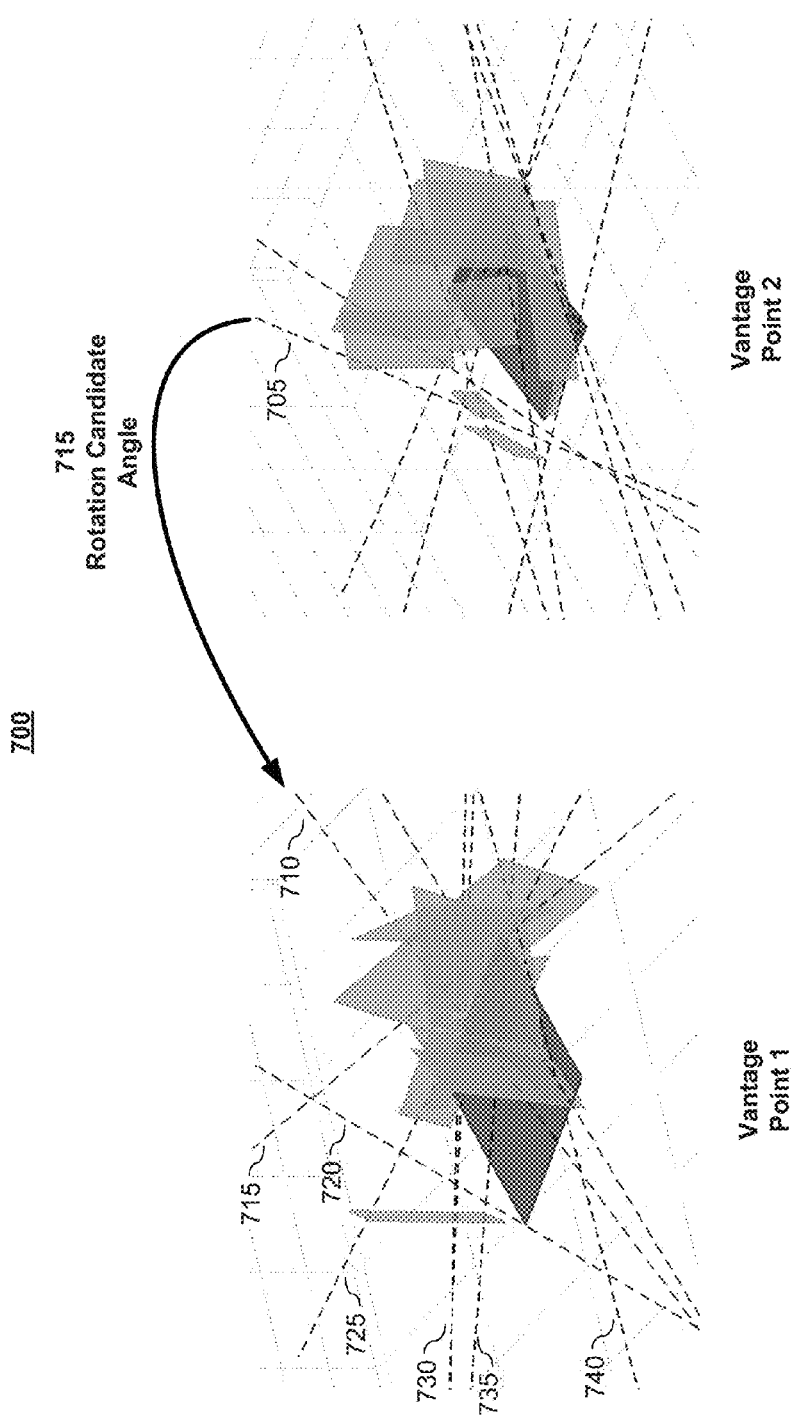
FIG. 7 illustrates examples potential guidelines that may be used to identify potential rotations between vantage points according to embodiments of the present invention.

In embodiments, the next step is to identify (430) intersections of potential wall planes with the floor plane. These intersections may be used as guidelines to provide rotation estimates between vantage points. For example, FIG. 7 illustrates examples of potential guidelines (e.g., 705-740) that may be used (according to embodiments of the present invention) to identify potential rotations between vantage points. As will be explained in more detail in the following section, guideline 705 in vantage point 2 may be found to correspond to guideline 710 in vantage point 1.

g. In-Plane Rotation Estimate

In embodiments, the intersections identified in the prior section may be used as guidelines to provide (435) rotation estimates between vantage points. In embodiments, all of the intersections may be used to estimate rotations between vantage points. A set of the top most common or most voted-for candidate rotation between two vantage points may be selected. In embodiments, a 0-2π interval may be divided into 16 bins to facilitate the voting, although one skilled in the art shall recognize that any of a number of voting mechanisms may be used. For example, the top 16 in-plane rotation estimate may be selected.

h. In-Plane Translation Estimate

In embodiments, the voxel map for a vantage point is rotated (440) according to a rotation estimate and an in-plane two-dimensional (2D) translation is estimated by comparing sliding 2D maps. In embodiments, the in-plane 2D translation estimates may be obtained exhaustively. This process may be repeated for all of the top in-plane rotation estimates. In embodiments, the in-plane rotation and in-plane 2D translation combination with the smallest combined error may be selected.

i. In-Plane Translation Estimate

Having obtained a canonical transform for the floor plane, an in-plane rotation estimate, and an in-plane translation estimate, these items may be combined into a transformation matrix (e.g., a 4×4 transformation matrix).

4. User-Assisted Scene Registration

As previously noted, embodiments of the present invention may include or alternatively use a user-assisted registration. Embodiments of user-assisted scene registration utilize a point acquisition device (such as, by way of example and not limitation, a Near Infra-Red (NIR) point marker) to capture 3D points by a number of orbs from different vantage points. The measurements are utilized to create scene registration information. In embodiments, the registration may also include utilizing a Bundle Adjustment methodology, which is described in more detail below, applied on points obtained using a point acquisition device.

a. Formal Issue Definition

Given a plurality of orbs O≥2 in the system that are oriented towards the same scene and that for some of the pairs of the orbs it is possible to place a 3D point in the space and have two or more orbs capture it, each orb produces a depth map and a Near Infra-Red (NIR) map. In embodiments, pixels in the depth map and the NIR map are assumed to correspond, and the dimensions of the two maps are assumed to be identical, width W, height H. Assuming that the orbs are calibrated, for a given point (x,y), it is possible to estimate a 3D representation (X,Y,Z). It should be noted that two-dimensional (2D) coordinates will be denoted with lower case variable names and three-dimensional (3D) coordinates will be denoted with upper case variable names. Homogenous and 3D vectors may be used interchangeably when the context is clear.

The user-assisted methodologies herein address the problem of calculating O, 4×4 matrices, denoted as $T_1, \ldots, T_O$. The assumption is that for any physical point $\vec{P}$, which is captured by two orbs i and j and as $\vec{P}_i$ and $\vec{P}_j$, respectively, the following error is small:

$$Er=\|T_i\vec{P}_i - T_j\vec{P}_j\|.$$

Thus, in embodiments, the input to the user-assisted methodologies herein is a set of N measurement sets. Each measurement set corresponds to 3D points in one orb associated with a time/frame identifier (to be addressed as "time stamp"). The assumption is that two points with similar time stamp in the measurement sets corresponding to two orbs correspond to the same physical point.

b. General Methodology

FIG. 8 depicts a method for user-assisted scene registration according to embodiments of the present invention. As shown in FIG. 8, in embodiments, the method commences by generating (805) a Near Infra-Red image mask for each input device. That is, prior to monitoring a NIR image to identify points, an orb mask is created to eliminate potential problem areas. This mask identifies any pixels that receive direct IR radiation by examining the NIR image over a period of time (e.g., 100 frames). NIR points in the NIR image that do not drop to zero during the mask orb creation process are masked and only activity in other pixels trigger the point detection process.

Figure 10:
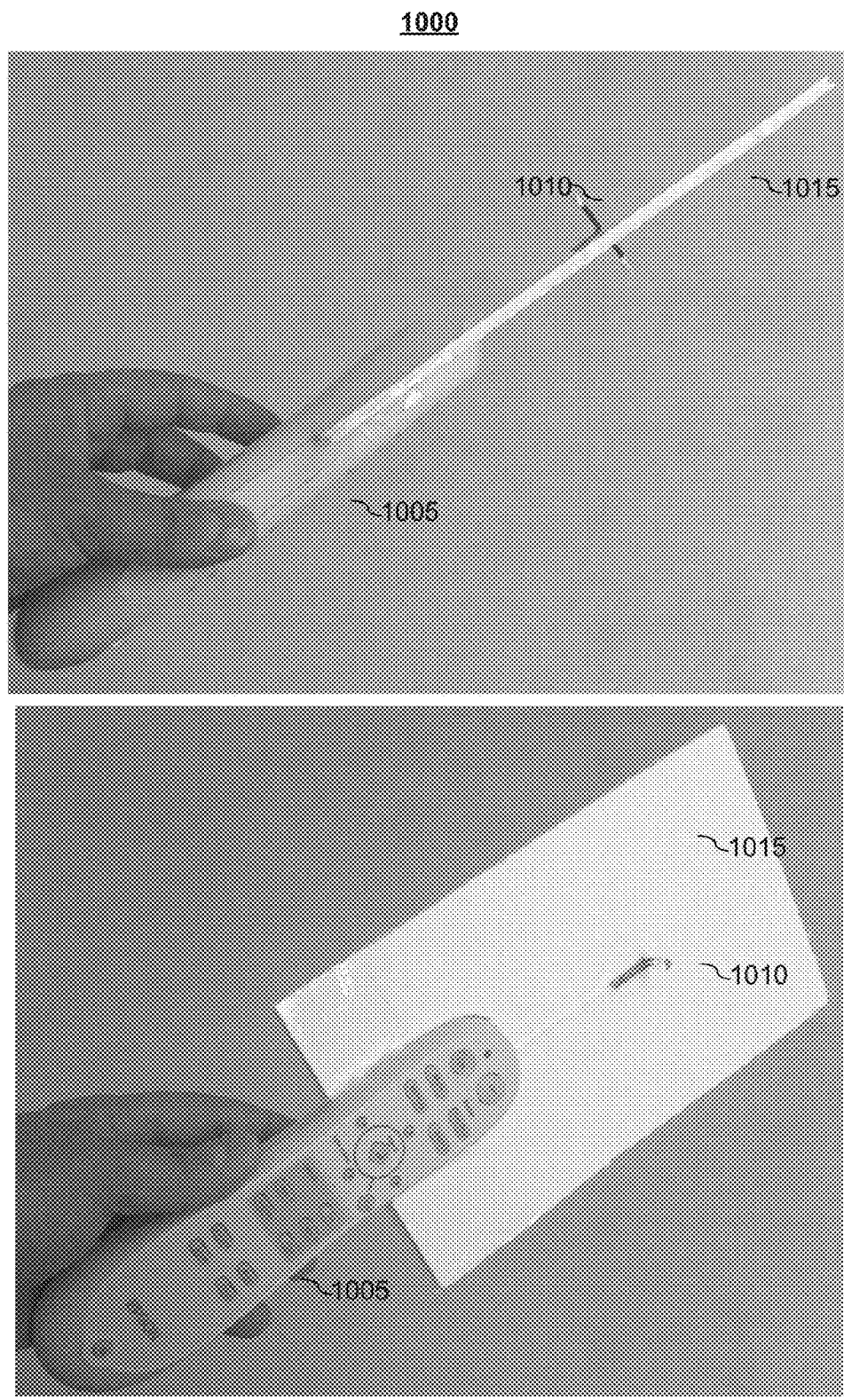
FIG. 10 depicts the side and front views of a point acquisition device according to embodiments of the present invention.

Next, a NIR device is positioned (810) within the field of view (or capture area) of at least two input devices. FIG. 10 depicts the side and front views of a NIR device according to embodiments of the present invention. As shown in the FIG. 10, this device comprises a common remote control 1005, one or more NIR emitters or light emitting diode (LED) 1010, and one or more planar surfaces 1015. The NIR emitters 1010 are provided to help the orb identify the point in space and the planar surface (which is optional) provides a larger surface from which to get a depth measurement. It shall be noted that the device may have a number of emitters and may be configured in a number of directions. The embodiment 1000 depicted in FIG. 10 is provided by way of illustration only.

One or more NIR signals from the device (e.g., device 1000) are used (815) to identify the point for each of the input images. For example, the device may be held firmly at a point in the scene where at least two orbs can see the NIR pulses. After a set time (e.g., 15 seconds), the button on the device is pressed and held for some time period (e.g., 5 seconds).

In embodiments, a number of captures at the same location may be obtained. By taking a number of captures, the accuracy can be increased. Thus, for example, after the 5-second pulse, a 15-second rest period may be observed and the button may then be pressed again for 5 seconds. This process may be repeated (820) a number of time (e.g., 4 times), or until a feedback mechanism identifies that the point has been captured a set number of time (e.g., at least 4 times).

In embodiments, this process may be repeated (825) with any two orbs that have overlapping capture areas in a number of different physical points in the space (e.g., 10 or more).

FIG. 9 depicts a method for data acquisition of the points according to embodiments of the present invention. In embodiments, the data acquisition process involves monitoring of the NIR image in search of zero crossings. For example, in embodiments, the holocam system keeps the history of a set of past frames (e.g., past 5 frames, in which the current frame is addressed as $frame_0$, the previous one as $frame_{-1}$, and so forth). Upon finding (905) a point which has been zero in one or more frames (e.g., $frame_0$ and $frame_{-1}$) of the depth map and non-zero in $frame_{-2}$, $frame_{-3}$, and $frame_{-4}$ of the depth map, this point is considered to correspond to the point acquisition device. When this trigger is detected, a binary mask of zero pixels in one of the frames with zero values (e.g., $frame_0$) is calculated and the center of mass is calculated. This center of mass point may be addressed as the point (x,y), where (x,y) represents the indices of the pixel location in the depth map.

In embodiments, an average depth value (e.g., mean, median, or mode) of the values in a neighborhood of the point (x,y) (e.g., 7×7 neighborhood) in the depth map of one of the prior non-zero frames (e.g., $frame_{-3}$) is then calculated (915), and may be addressed as Z. It shall be noted that one of the benefits of having a planar surface (e.g., surface 1015) around the LED (e.g., emitter 1010) in the point device (e.g., device 1000) is to provide a larger surface from which to capture a depth value since detecting depth tends to be a noisy process. Thus, the emitter tells where to look in the image and the planar surface provides a neighborhood of depth values.

In embodiments, using the depth value Z, the real world X and Y coordinates corresponding to the (x,y) point may be calculated as follows:

$$X = \frac{x - c_x}{f_x} Z;$$

and $$Y = \frac{y - c_y}{f_y} Z,$$

where $c_x$, $c_y$, $f_x$, and $f_y$, correspond to the orb's intrinsic parameters of camera center and focal point (respectively) in the x and y directions.

It should be noted that, in embodiments in which multiple captures are taken of the same point, a point may be accepted only if there are at least some threshold number (e.g., 3) of other readings in the same orb within a threshold radius (e.g., within a 25 mm radius).

c. Mathematical Model Embodiments of Bundle Adjustment

It is assumed that N measurements are available. Here, measurement number n is identified using the four identities $o_{n1}$, $o_{n2}$, $\vec{P}_{n1}$, and $\vec{P}_{n2}$—that is, the same physical point has been observed by orb $o_{n1}$ as $\vec{P}_{n1}$ and by orb $o_{n2}$ as $\vec{P}_{n2}$. It is also assumed that always $o_{n1} < o_{n2}$.

The matrices $T_1, \ldots, T_O$ may be estimated by minimizing the following error function:

$$Er(T_1, \ldots, T_O) = \sum_{n=1}^{N} \left\| T_{o_{n1}} \vec{P}_{n1} - T_{o_{n2}} \vec{P}_{n2} \right\|^2.$$

It should be noted that $T_i$ contains 12 non-trivial elements, as shown below:

$$T_i = \begin{bmatrix} t_0 & t_1 & t_2 & t_3 \\ t_4 & t_5 & t_6 & t_7 \\ t_8 & t_9 & t_{10} & t_{11} \\ 0 & 0 & 0 & 1 \end{bmatrix}.$$

It should also be noted that for $$\vec{P}_i = \begin{bmatrix} X \\ Y \\ Z \\ 1 \end{bmatrix},$$

the following identity holds:

$$T_i \vec{P}_i \equiv \begin{bmatrix} X & Y & Z & 1 & 0 & 0 & 0 & 0 & 0 & 0 & 0 & 0 \\ 0 & 0 & 0 & 0 & X & Y & Z & 1 & 0 & 0 & 0 & 0 \\ 0 & 0 & 0 & 0 & 0 & 0 & 0 & 0 & X & Y & Z & 1 \end{bmatrix} \begin{bmatrix} t_0 \\ t_1 \\ t_2 \\ t_3 \\ t_4 \\ t_5 \\ t_6 \\ t_7 \\ t_8 \\ t_9 \\ t_{10} \\ t_{11} \end{bmatrix}.$$

An operator M( ) is defined which produces a 3×1 vector (or equally given the 4×1 homogeneous representation of it), $$M\left(\begin{bmatrix} X \\ Y \\ Z \\ 1 \end{bmatrix}\right) = \begin{bmatrix} X & Y & Z & 1 & 0 & 0 & 0 & 0 & 0 & 0 & 0 & 0 \\ 0 & 0 & 0 & 0 & X & Y & Z & 1 & 0 & 0 & 0 & 0 \\ 0 & 0 & 0 & 0 & 0 & 0 & 0 & 0 & X & Y & Z & 1 \end{bmatrix}.$$

An operator E( ) is also defined which produces a 3×12 (O−1) matrix M and 1≤o<O, as follows:

$$E = \lfloor Z_{3 \times 12(o-1)} M Z_{3 \times 12(O-o-1)} \rfloor.$$

Here, $Z_{h \times w}$ is a matrix of height h and width w of zeros.
An operator G( ) is also defined which produces a 12×1 matrix given a 4×4 matrix T, as follows:

$$G\left(\begin{bmatrix} t_0 & t_1 & t_2 & t_3 \\ t_4 & t_5 & t_6 & t_7 \\ t_8 & t_9 & t_{10} & t_{11} \\ 0 & 0 & 0 & 1 \end{bmatrix}\right) = \begin{bmatrix} t_0 \\ t_1 \\ t_2 \\ t_3 \\ t_4 \\ t_5 \\ t_6 \\ t_7 \\ t_8 \\ t_9 \\ t_{10} \\ t_{11} \end{bmatrix}$$

Then, it is asserted that, $$T_{o_{ni}} \vec{P}_{ni} = E(M(\vec{P}_{ni}), o_{ni}) \vec{T},$$

when $o_{ni} < O$. Here, $$\vec{T} = \begin{bmatrix} G(T_1) \\ \vdots \\ G(T_{O-1}) \end{bmatrix}.$$

It is assumed that $T_O$ is known, for example because it represents a conversion to a canonical coordinate system or that is equal to the identity matrix.

Also, it should be noted that $$\|T_{o_{n1}} \vec{P}_{n1} - T_{o_{n2}} \vec{P}_{n2}\| = \|A_{o_{n1} o_{n2}} \vec{T} - \vec{b}_{o_{n1} o_{n2}}\|.$$

Here, $A_{ij}$ is a 3×12(O−1) matrix and $\vec{b}_{ij}$ is a 3×1 vector, as defined below:

$$A_{o_{n1} o_{n2}} = \begin{cases} E(M(\vec{P}_{n1}), o_{n1}) - E(M(\vec{P}_{n2}), o_{n2}) & o_{n2} < O \\ E(M(\vec{P}_{n1}), o_{n1}) & o_{n2} = O \end{cases}$$

$$\vec{b}_{o_{n1} o_{n2}} = \begin{cases} \vec{0} & o_{n2} < O \\ T_O \vec{P}_{n2} & o_{n2} = O \end{cases}$$

Now, the error function may be rewritten as:

$$Er(T_1, \ldots, T_O) = \sum_{n=1}^{N} \|A_{o_{n1} o_{n2}} \vec{T} - \vec{b}_{o_{n1} o_{n2}}\|^2,$$

and we have, $$\nabla Er(T_1, \ldots, T_O) = 2 \sum_{n=1}^{N} A_{o_{n1} o_{n2}}^T A_{o_{n1} o_{n2}} \vec{T} - 2 \sum_{n=1}^{N} A_{o_{n1} o_{n2}}^T \vec{b}_{o_{n1} o_{n2}}$$

which yields $$\vec{T} = \left( \sum_{n=1}^{N} A_{o_{n1} o_{n2}}^T A_{o_{n1} o_{n2}} \right)^{-1} \sum_{n=1}^{N} A_{o_{n1} o_{n2}}^T \vec{b}_{o_{n1} o_{n2}}.$$

Using the inverse of the G( ) operator on the appropriate elements of $\vec{T}$ will produce $T_1, \ldots, T_{O-1}$ ($T_O$ is already known).

d. Evaluation Metrics

An N×O bundle matrix B may be created. A row n in this matrix corresponds to one instance in which the point acquisition device is visible by at least two orbs. Hence, each row in B has at least two ones in it.

In embodiments, a Connectivity Factor of orb #o to the system may be defined as the number of instances in which orb o and at least another orb both observe the point acquisition device. A connection graph for the bundle may also be drawn. The strength of edge in this graph identifies the number of times and both observe the point acquisition device.

The error range for orb o may be defined as the minimum and maximum of $\|T_{o_{n1}}\vec{P}_{n1} - T_{o_{n2}}\vec{P}_{n2}\|$ when either $o_{n1}$ or $o_{n2}$ is o.

e. Experimental Results

Figure 11:
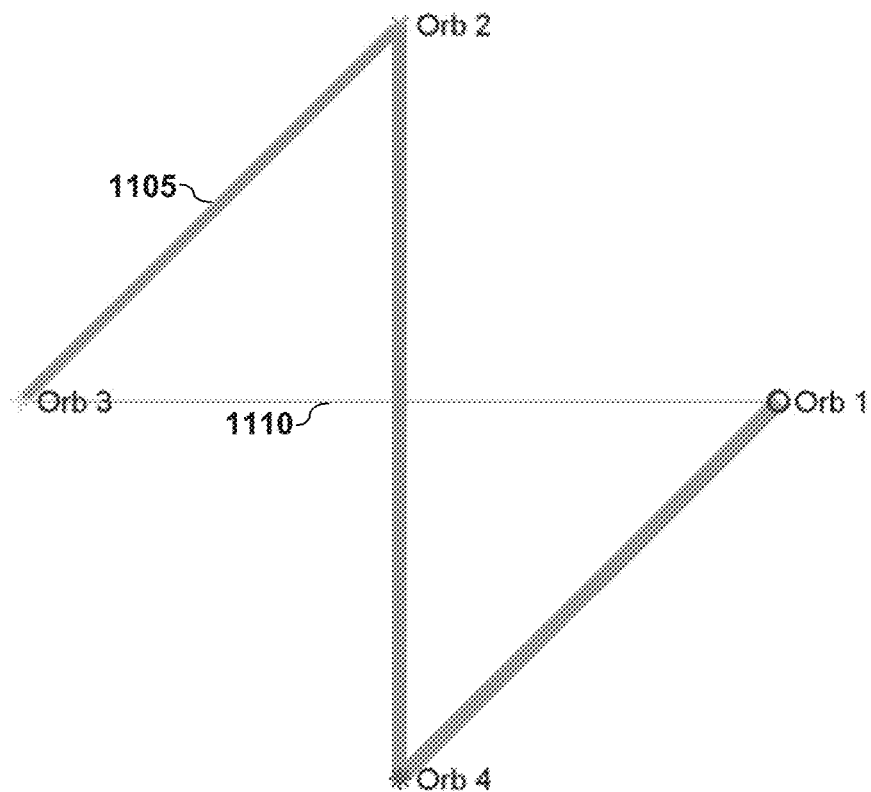
FIG. 11 shows an example of a Connectivity Graph according to embodiments of the present invention.

By way of illustration and not limitation, the following experimental results are provided. In one instance, four orbs were considered. The following identifies the number of 3D points observed in each orb, 97, 255, 119, and 214, for orbs 1, 2, 3, and 4 (respectively). FIG. 11 shows a Connectivity Graph for this experiment according to embodiments of the present invention. In the depicted Connectivity Graph of FIG. 11, the Connectivity Factors corresponding to this experiment are as follows, 39.55%, 60.45%, 30.60%, and 69.40% for the four orbs. The thicker lines show the stronger connections between orbs. Thus, as seen in FIG. 11, Orbs #1 and #4 are more strongly connected than Orbs #1 and #3. In total, 402 matching points between pairs of orbs were discovered in this dataset.

Figure 12:
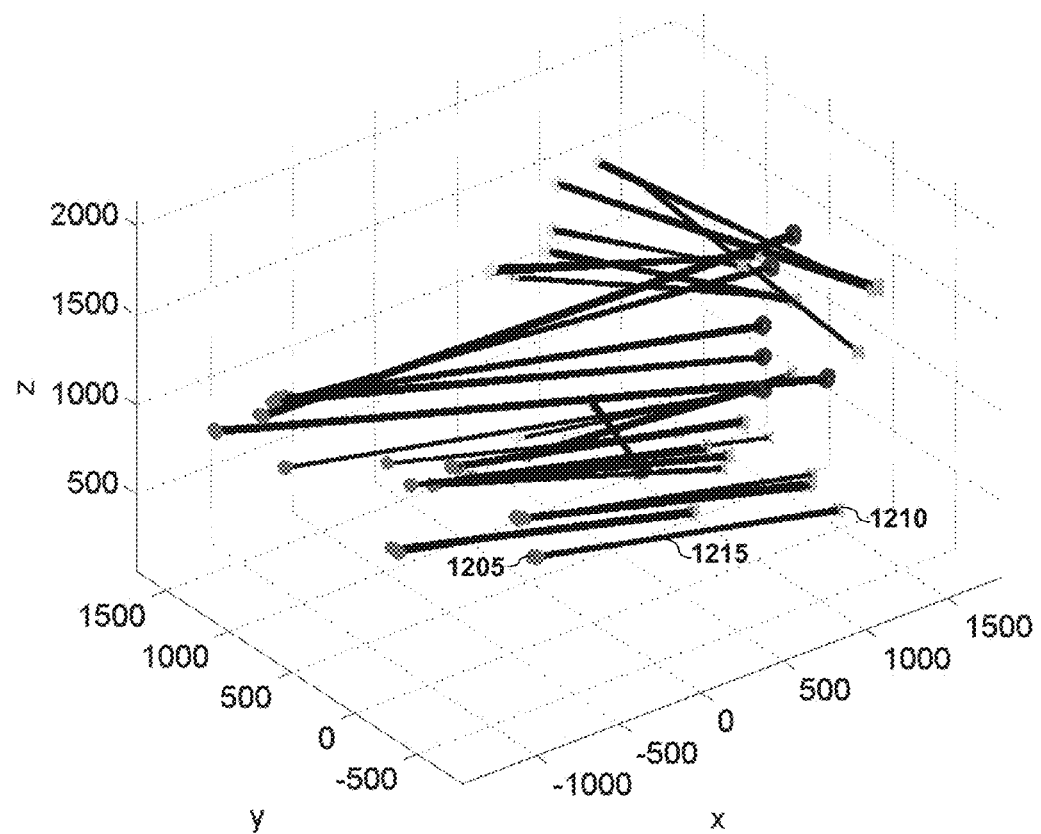
FIG. 12 depicts matching pairs of points between orbs before the scene registration procedure according to embodiments of the present invention.

FIG. 12 depicts matching pairs of points between orbs before the scene registration procedure according to embodiments of the present invention. This figure illustrates many pairs of points connecting the pairs of orbs. For example, a point 1205 in Orb #4 has a matching point 1210 in Orb#2, thereby forming a connection 1215 between the orbs.

Figure 13:
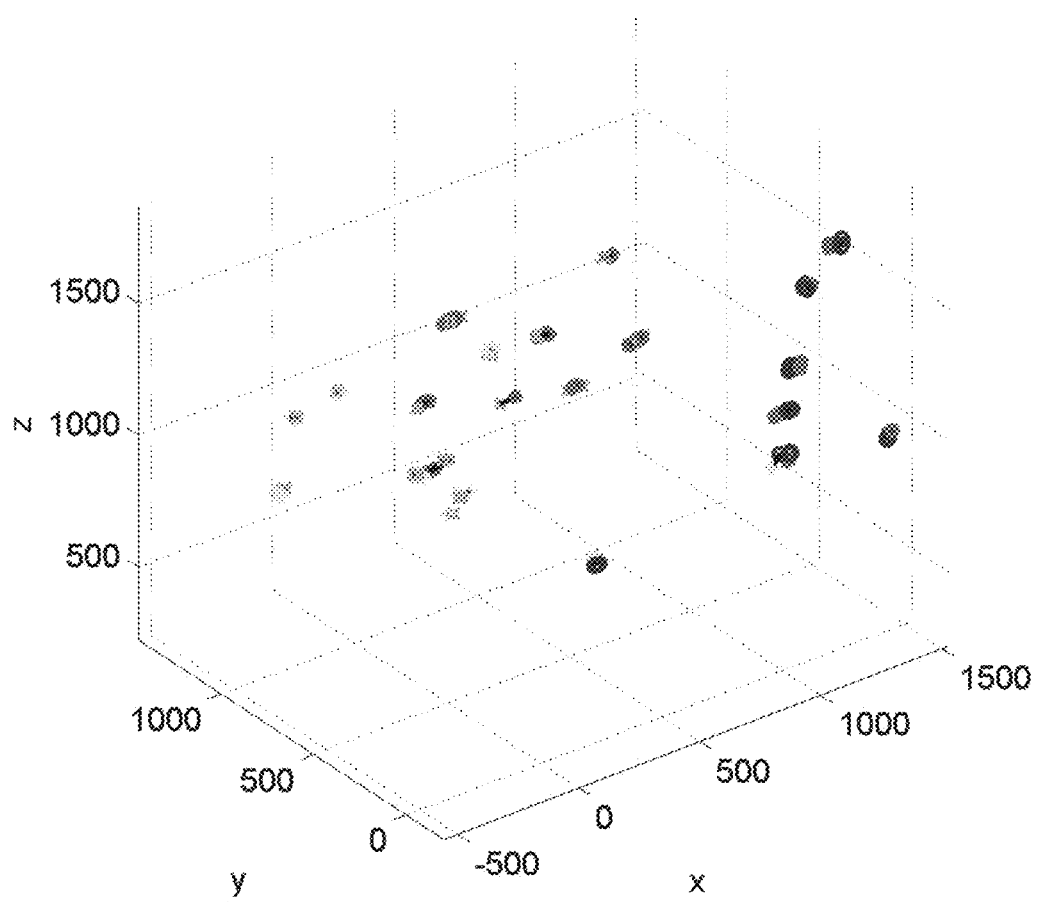
FIG. 13 depicts matching pairs of points between orbs after the scene registration procedure according to embodiments of the present invention.

Following the Bundle Adjustment process outlined in Section 4.c (above), scene registration information is estimated for the four orbs and the matching points may be visualized after transformation, as seen in FIG. 13. FIG. 13 depicts matching pairs of points between orbs after the scene registration procedure according to embodiments of the present invention. Here, it is seen that the pairs of matching points are adjacent. In this case, $T_4$ is the canonical transformation.

$$T_4 = \begin{bmatrix} 0.58 & 0.38 & -0.72 & 2564.18 \\ 0.82 & -0.24 & 0.52 & -464.84 \\ 0.023 & -0.89 & -0.45 & 2115.29 \\ 0 & 0 & 0 & 1 \end{bmatrix}$$

The rest of the matrices were calculated as follows:

$$T_1 = \begin{bmatrix} -0.37 & 0.48 & -0.84 & 2502.55 \\ 0.92 & 0.12 & -0.21 & 648.07 \\ -0.01 & -0.79 & -0.45 & 1860.74 \\ 0 & 0 & 0 & 1 \end{bmatrix}$$

$$T_2 = \begin{bmatrix} 0.22 & -0.43 & 1.01 & -2026.65 \\ -0.96 & -0.13 & 0.20 & -2.70 \\ -0.02 & -0.83 & -0.30 & 1790.54 \\ 0 & 0 & 0 & 1 \end{bmatrix}$$

$$T_3 = \begin{bmatrix} -1.02 & -0.17 & 0.92 & -1557.41 \\ -0.78 & 0.14 & -0.50 & 1902.36 \\ -0.01 & -0.94 & -0.20 & 1831.98 \\ 0 & 0 & 0 & 1 \end{bmatrix}$$

Table 1 (below) lists the error values for this result.

TABLE 1

| ORB1 | ORB2 | Min Error | Max Error | Median Error |
|------|------|-----------|-----------|--------------|
| 1 | 2 | — | — | — |
| 1 | 3 | 16.50 mm | 57.50 mm | 26.75 mm |
| 1 | 4 | 7.67 mm | 48.98 mm | 23.43 mm |
| 2 | 3 | 6.14 mm | 61.69 mm | 18.42 mm |
| 2 | 4 | 8.52 mm | 131.06 mm | 54.08 mm |
| 3 | 4 | — | — | — |

Note, for example, the min-max range for Orb #4 is 7.67-131.06 mm.

By way of comparison, Table 2 (below) lists the results of the direct calculation of the scene registration information for this same data.

TABLE 2

| ORB1 | ORB2 | Min Error | Max Error | Median Error |
|------|------|-----------|-----------|--------------|
| 1 | 2 | — | — | — |
| 1 | 3 | 204.89 mm | 296.02 mm | 205.98 mm |
| 1 | 4 | 15.71 mm | 61.42 mm | 35.99 mm |
| 2 | 3 | 12.75 mm | 80.20 mm | 39.16 mm |
| 2 | 4 | 17.57 mm | 148.10 mm | 55.97 mm |
| 3 | 4 | — | — | — |

It should be noted that in every case the results of the Bundle Adjustment of the present patent document are superior to direct calculation. Also, for the case of Orb#1-Orb#3, where a weak connection between the two orbs exists, direct calculation produces error values around 200 mm for all the points. Bundle Adjustment, on the other hand, manages to cut this error by a factor of approximately more than 7. In fact, for the methodology of the present patent document, the error level at this weak pair is comparable to the other, stronger, pairs, as expected by the logic of Bundle Adjustment.

5. Projective Bundle Iterative Closest Point (ICP)

Embodiments of the present invention may include projective bundle iterative closest point (ICP) methodologies that take as inputs two or more organized point clouds captured by projective devices, such as time-of-flight sensors, as well as preliminary scene registration information, and produce enhanced scene registration information. The applications of such methodologies are in adjusting inaccuracies in scene registration information produced by other algorithms, in updating scene registration information as one or more orb moves in space, or both. It should be noted that, in embodiments, a subset of the projective bundle ICP approach is projective ICP, which processes two point clouds.

a. Formal Issue Definition

In embodiments, an organized point cloud is a 2D array of 3D vectors organized in a consistent grid, i.e. if the point $\vec{P}_2 = [x_2\ y_2\ z_2]^T$ is to the right and bottom of $\vec{P}_1 = [x_1\ y_1\ z_1]^T$, then $x_2 < x_1$ and $y_2 > y_1$. An organized point cloud that satisfies this property may be captured by a projective depth measurement device (such as, by way of example and not limitation, a time-of-flight sensor, a Kinect-style device, or the like).

Scene registration information for a number of organized point cloud $P_1, P_2 \ldots, P_O$ contains a 3×3 rotation matrix $R_o$ and a 3×1 translation matrix $\vec{T}_o$ per point cloud. In this document, the number of orbs may be denoted as O. In embodiments, the scene registration information is by definition a mapping between the corresponding point clouds—that is, for pairs of points $\vec{P}_i \in P_i$ and $\vec{P}_j \in P_j$, we have:

$$R_i \vec{P}_i + \vec{T}_i \approx R_j \vec{P}_j + \vec{T}_j$$

b. Evaluation Metric

In embodiments, for a set of N pairs of corresponding 3D points $\vec{P}_{n1}$ and $\vec{P}_{n2}$, where $\vec{P}_{n1}$ belongs to point cloud $o_{n1}$ and $\vec{P}_{n2}$ belongs to point cloud $o_{n2}$, an evaluation metric may be defined as follows:

$$\Delta = \sum_{n=1}^{N} \left\| R_{O_{n1}} \vec{P}_{n1} + \vec{T}_{O_{n1}} - R_{O_{n2}} \vec{P}_{n2} - \vec{T}_{O_{n2}} \right\|^2.$$

c. Mathematical Model Embodiments i. Reprojection—Pair Wise

Figure 14:
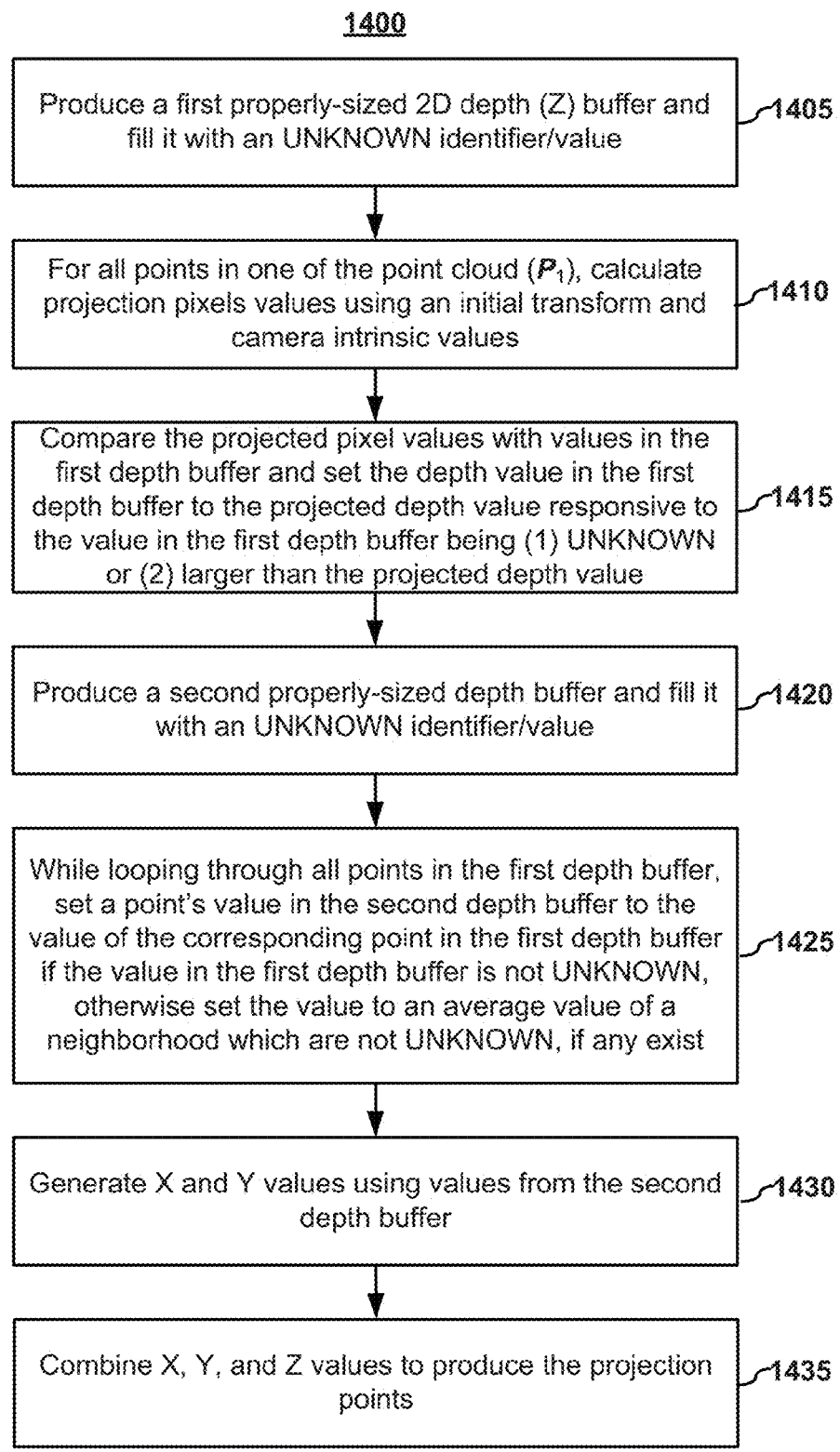
FIG. 14 depict a methodology for performing a reprojection according to embodiments of the present invention.

Assuming that two organized point clouds $P_1$ and $P_2$ and an estimate of the scene registration information R and $\vec{T}$ exist, $P_1$ may be reprojected into $P_2$ as a new organized point cloud $P_1^*$. FIG. 14 depicts a methodology for performing a reprojection according to embodiments of the present invention.

In embodiments, the methodology commences by producing (1405) a first properly-sized 2D depth (Z) buffer and filling it with an UNKNOWN identifier/value. Then, projection pixels values are calculated using an initial transform and camera intrinsic values. The projected pixel values are compared (1415) with values in the depth buffer and the depth value in the first depth buffer are set to the projected depth value responsive to the value in the first depth buffer being either UNKNOWN or larger than the projected depth value. In embodiments, steps 1410 and 1415 may performed by looping over all points in point cloud $P_1$ to perform the following:

(a) calculate $\vec{P}_1^* = R\vec{P}_1 + \vec{T}$ and set $\vec{P}_1^* = [x_1^* y_1^* z_1^*]^T$;
(b) calculate $$i = \left[f_x \frac{x_1^*}{z_1^*} + c_x\right] \text{ and } j = \left[f_y \frac{y_1^*}{z_1^*} + c_y\right];$$

and (c) if Z[i,j] is UNKNOWN, set it to $z_1^*$; otherwise, if it is larger than $z_1^*$, set it to $z_1^*$.

Returning to FIG. 14, a second properly-sized 2D depth buffer ($Z_2$) is also produced (1420) and filled with an UNKNOWN identifier/value. Looping through all points in the first depth buffer (Z), if the depth value Z[i,j] is not UNKNOWN, set (1425) the corresponding point in the second depth buffer $Z_2$[i,j] to that value, otherwise set (1425) it to an average (e.g., mean, median, or mode) value of a neighborhood (e.g., the eight neighbors of Z[i,j]) which are not UNKNOWN, if any exist.

Given a final depth buffer, two properly-sized buffers X and Y may be calculated (1430) using values in the final depth buffer. In embodiments, the real world X and Y values may be calculated as follows:

$$X[i, j] = \frac{i - c_x}{f_x} Z[i, j] \text{ and } Y[i, j] = \frac{i - c_y}{f_y} Z[i, j],$$

where Z[i,j] is the final depth buffer (i.e., the second depth buffer).

The X, Y, and Z values may then be combined (1435) to produce the projection points $P_1^*$.

Figure 15:
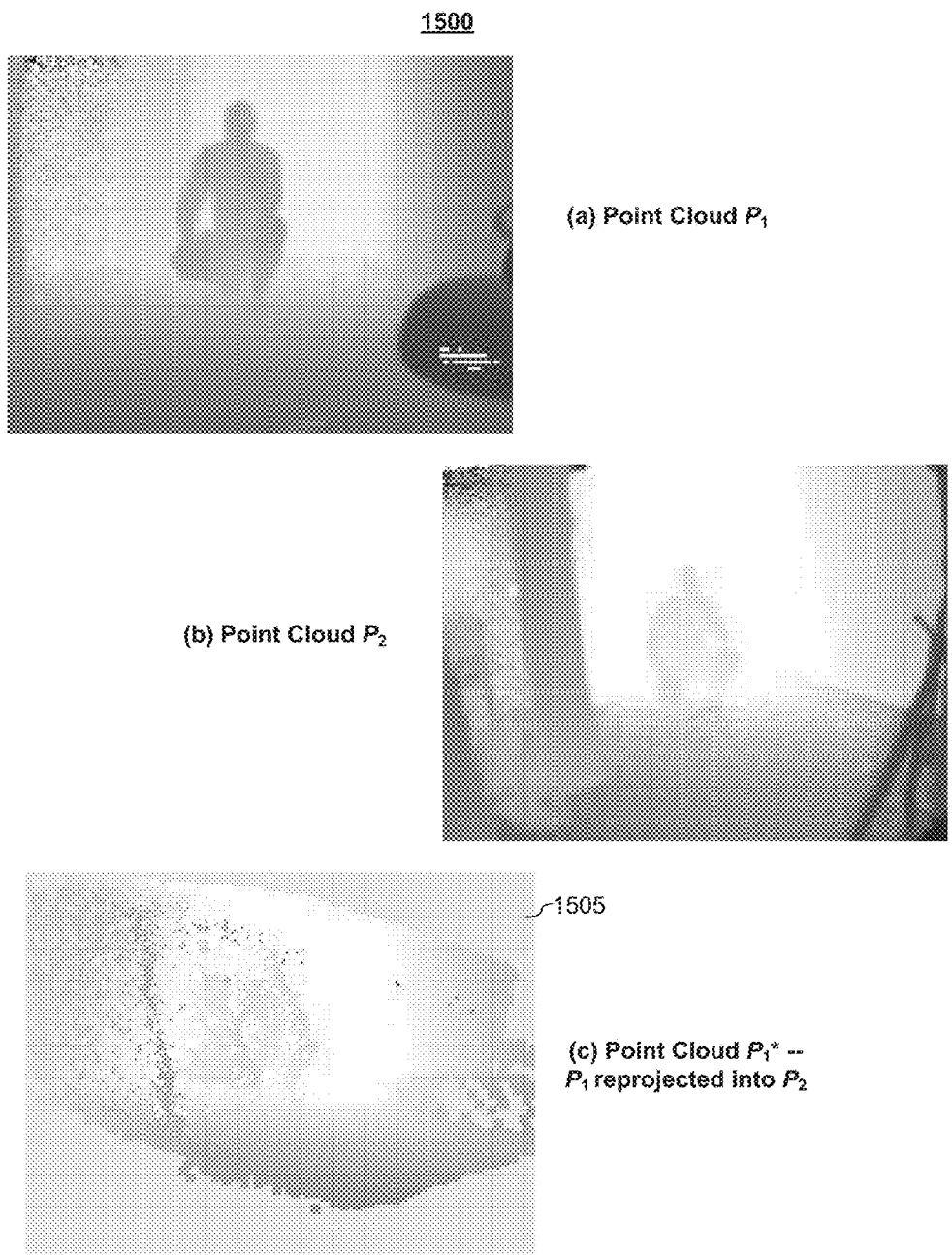
FIG. 15 depicts sample results of reprojection according to embodiments of the present invention.

FIG. 15 depicts sample results of reprojection according to embodiments of the present invention. In FIG. 15, image (a) represents a first organized point cloud $P_1$; image (b) represents a second organized point cloud $P_2$; and image (c) represents $P_1^*$, which is $P_1$ reprojected into $P_2$. As shown in image (c) of FIG. 15, UNKNOWN areas may be set to a color/gray value (see, e.g., area 1505).

ii. Reprojection

Bundle

In embodiments, pair-wise projection refers to the case in which one point cloud is assumed to be static. This condition is applicable when the methodology is applied to two point clouds, i.e. O=2.

In embodiments of bundle reprojection, each point cloud has its own pair of rotation and transformation entities. Assuming that the two point clouds $o_1$ and $o_2$ are inputted into a reprojection methodology, where $o_2$ is to be reprojected onto $o_1$, embodiments of bundle reprojection involve finding the pairwise reprojection and then following up with pair-wise reprojection. Here, the pairwise R and $\vec{T}$, which may be utilized as outlined in Section 5.c.i (above) (calculate $\vec{P}_1^* = R\vec{P}_1 + \vec{T}$ and set $\vec{P}_1^* = [x_1^* y_1^* z_1^*]^T$), are introduced and calculated.

Denoting the scene registration information for the point clouds $o_1$ and $o_2$ as $(R_{o_1}, \vec{T}_{o_1})$ and $(R_{o_2}, \vec{T}_{o_2})$, respectively, the pairwise transformation may be calculated as follows:

$$R = R_{O_1}^{-1} R_{O_2}$$

$$\vec{T} = R_{o_1}^{-1} (\vec{T}_{o_2} - \vec{T}_{o_1})$$

iii. Rigid Body Movement

Assume that there is a set of N pairs of 3D vectors $\vec{P}_{n1}$ and $\vec{P}_{n2}$ and that we want to estimate a rotation matrix R and a translation vector $\vec{T}$, for which $R\vec{P}_{n1} + \vec{T}$ is close to $\vec{P}_{n2}$. In other words, the following error function is sought to be minimized:

$$\Delta = \sum_{n=1}^{N} \left\| R\vec{P}_{n1} + \vec{T} - \vec{P}_{n2} \right\|^2.$$

It is known that the solution to this problem may be calculated as follows:

$$\vec{T} = \frac{1}{N}\sum_{n=1}^{N} \vec{P}_2 - \frac{1}{N}R\sum_{n=1}^{N} \vec{P}_1$$

where, $$R = U\begin{bmatrix} 1 & 0 & 0 \\ 0 & 1 & 0 \\ 0 & 0 & \|UV^T\| \end{bmatrix} V^T,$$

where, $$USV^T = \frac{1}{N}\sum_{n=1}^{N}\left(\vec{P}_2 - \frac{1}{N}\sum_{n=1}^{N}\vec{P}_2\right)\left(\vec{P}_1 - \frac{1}{N}\sum_{n=1}^{N}\vec{P}_1\right)^T,$$

denotes the Singular Value Decomposition (SVD) transform.

iv. Projective ICP Pair-Wise

The notion of correspondence of points in two organized point clouds which have captured the same scene from two different vantage points is one of the distinctive elements of the ICP algorithms. For two organized point clouds $P_1$ and $P_2$ which are captured from the same vantage point and at the same viewing angle, i.e. R is identify and $\vec{T}$ is zero, the spatial assumption of consistency of the organized point clouds leads to the fact that points on the two organized point clouds may be matched based on the grid index, i.e. $P_1[i,j]$ corresponds to $P_2[i,j]$. This is an important property because it drops the need for having expensive search methods such as k-d tree decomposition. This is one of the key differentiating factors for the projective ICP methodologies developed in this patent document compared with the generic ICP algorithm.

Figure 16:
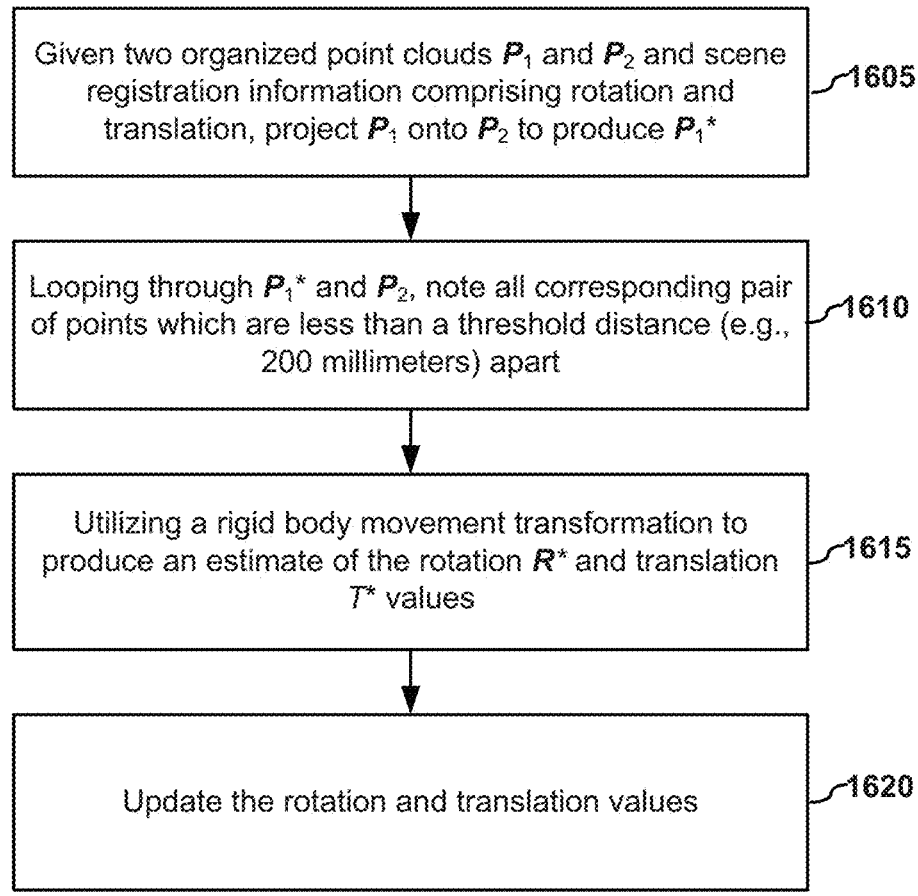
FIG. 16 depict a projective Iterative Closest Point (ICP) approach according to embodiments of the present invention.

Presented herein are embodiments of the projective ICP methodology. FIG. 16 depict a projective ICP approach according to embodiments of the present invention. Assuming that there are two organized point clouds $P_1$ and $P_2$ and the scene registration information R and $\vec{T}$, one of the point clouds (e.g., $P_1$) is projected (1605) onto the other point cloud (e.g., $P_2$) to produce $P_1^*$. In embodiments, the projected point cloud $P_1^*$ and the point cloud onto which the projected point cloud has been projected (in this example, $P_2$) are examined taking note of all corresponding pair of points that are less than a threshold distance (e.g., 200 millimeters) apart. Then, in embodiments, a rigid body movement methodology, such as described in Section 5.c.iii, is utilized (1615) to produce the pair R* and T*. Subsequently, R and T may be updated (1620) as follows:

$$R \leftarrow R^*R$$

$$\vec{T} \leftarrow R^*\vec{T} + \vec{T}^*$$

In embodiments, the normalized number of pairs of corresponding points which are utilized in this process may be addressed as "utilization." In embodiments, the value of the evaluation metric, Δ, may also be calculated.

In embodiments, the projective ICP algorithm may be iterated until: (1) the utilization is below a threshold level (e.g., 2%); (2) the algorithm has finished a number of iterations (e.g., 100 iterations); (3) when Δ is less than a threshold value (e.g., 10 millimeters); (4) if a set number of consecutive iterations (e.g., 10 iterations) produce less than a threshold level (e.g., 1 millimeter) of improvement in the value of Δ; or (5) some other stop condition is reached.

Figure 17:
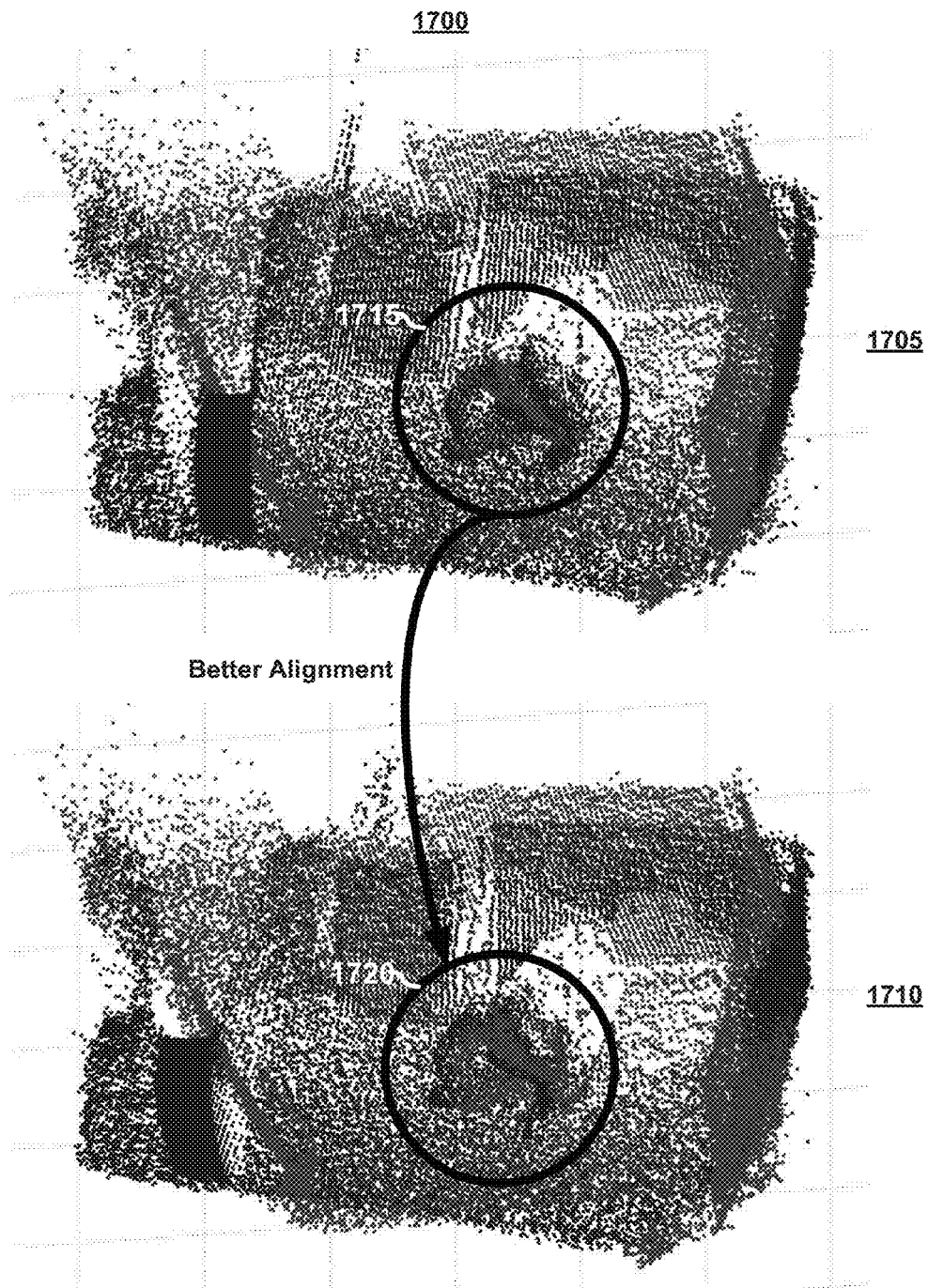
FIG. 17 shows a sample result following projective ICP according to embodiments of the present invention.
Figure 19:
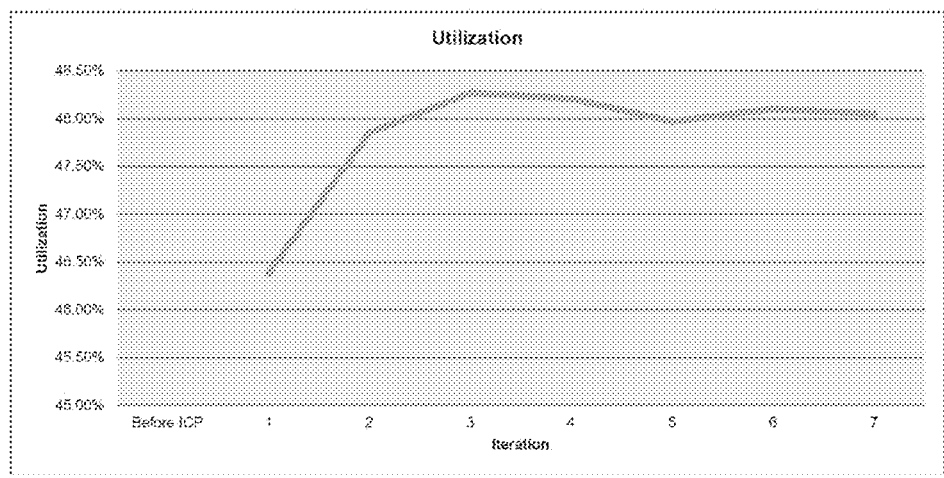
FIG. 19 presents the utilization as the projective ICP algorithm progressed towards convergence of the example in FIG. 17 according to embodiments of the present invention.
Figure 20:
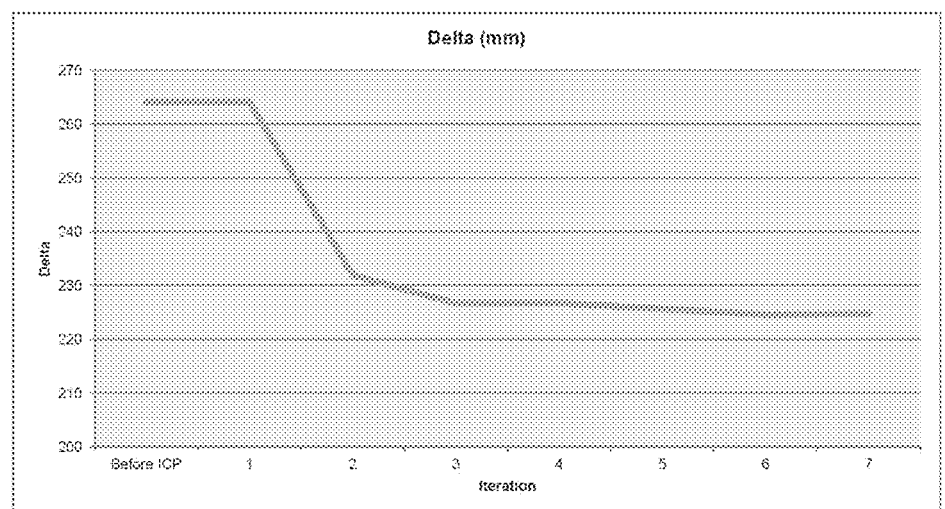
FIG. 20 shows the delta values as the projective ICP algorithm progressed towards convergence of the example in FIG. 17 according to embodiments of the present invention.

FIG. 17 shows a sample result following projective ICP according to embodiments of the present invention. Note that the projection which includes a set of points representing a person crouching 1715 is better aligned 1720 between the point clouds 1710 following adjustment due to projective ICP. In this example, after seven iterations the algorithm converged because the system became stationary. The table in FIG. 18 provides a summary of the numerical results of the process for the example in FIG. 17. The average utilization was 47.83% and there was a 17.55% reduction in misalignment (39.46 mm reduction in misalignment on average). FIG. 19 and FIG. 20 show the utilization and delta values (respectively) as the projective ICP algorithm progressed towards convergence of the example in FIG. 17. In this example, the method took 70.27 milliseconds to converge.

v. Projective ICP Bundle

In embodiments, the bundle projective ICP methodology extends the scope of its pair-wise counterpart to multiple point clouds. In this problem, multiple point clouds are projected onto one point cloud, which may be addressed as the "basis" of the iteration, and, in embodiments, the problem is to find the optimal representation of the basis which minimizes the error.

Figure 21:
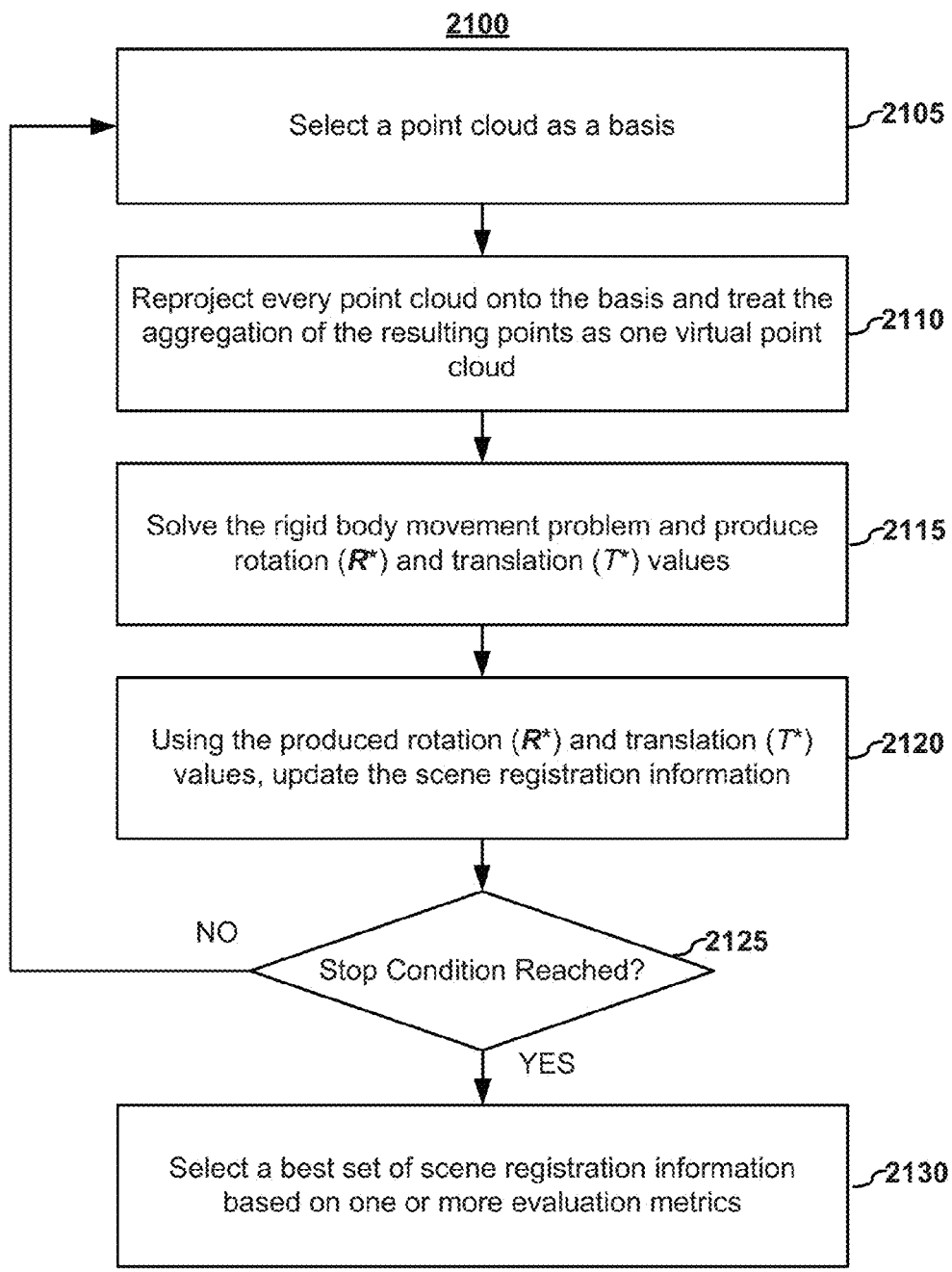
FIG. 21 depicts a method for performing projective bundle ICP according to embodiments of the present invention.

FIG. 21 depicts a method for performing projective bundle ICP according to embodiments of the present invention. As shown in FIG. 21, in embodiment, the process commences by selecting (2105) a point cloud as a basis. Every point cloud is then reprojected (2110) onto the basis and the aggregation of the resulting points is treated as one virtual point cloud. In embodiments, the reprojection may be performed as described in Section 5.c.ii (above). Subsequently, in embodiments, a rigid body movement methodology, such as described in Section 5.c.iii, is utilized (2115) and the rotation R* and translation T*values are obtained. The scene registration information may then be updated (2120), as follows, where o is any point cloud other than the basis and b is the basis:

$$R_o \leftarrow R_b R^* R_b^{-1} R_o$$

$$\vec{T}_o \leftarrow R_b R^* R_b^{-1}(\vec{T}_o - \vec{T}_b) + R_b \vec{T}^* + \vec{T}_b$$

In embodiments, the process involves iterating (2125) through the point clouds and each time pick one point cloud as the basis, which may be selected based upon a set rotation. Thus, in each iteration, one orb is considered as the basis and the scene registration information corresponding to the other orbs are updated. The process ends when a stop condition has been reached. In embodiment, a stop condition may be when the amount of enhancement of the alignment in a preselected number of iterations is less than a preselected threshold, although other or additional stop conditions may be used.

Following the end of the iteration process, a best set of scene registration information, based on one or more evaluation metrics, is selected (2130). In embodiments, the evaluation metric of Section 5.b (above) may be used.

Figure 22:
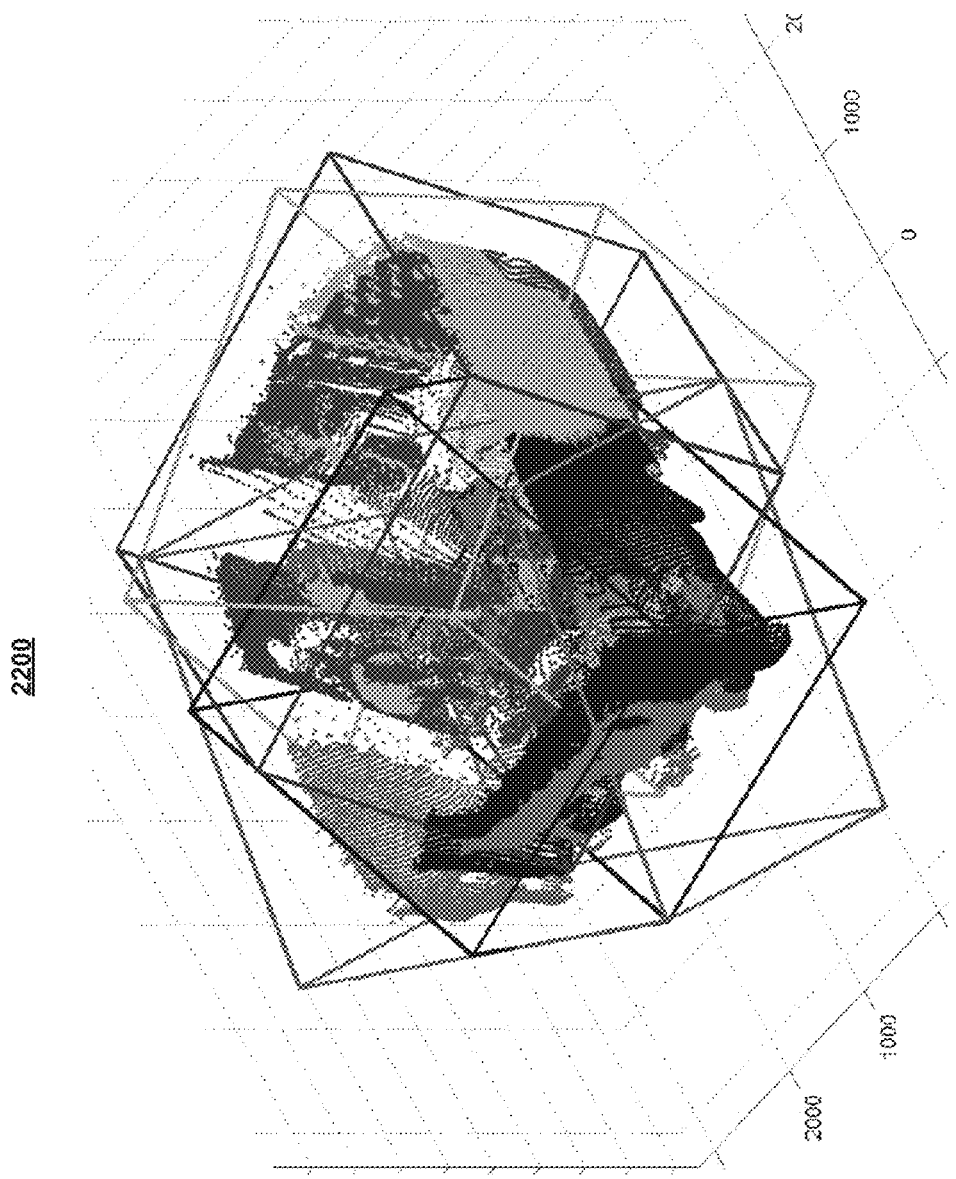
FIG. 22 shows a sample result of projective bundle ICP according to embodiments of the present invention.

FIG. 22 shows a sample result of projective bundle ICP according to embodiments of the present invention. In this example, there were four orbs, and a partial output log of the methodology is provided below:

- - - START OF OUTPUT LOG - - -

Rosa, Bundle ICP
Initialization . . .
Acquiring initial transformation . . .
Starting point—Delta=46.89 mm
Iteration 1 [Orb #1]—Utilization 51.43%, Delta=43.39 mm #(Low Gain)
Iteration 2 [Orb #2]—Utilization 46.68%, Delta=45.12 mm #(Low Gain)
Iteration 3 [Orb #3]—Utilization 58.71%, Delta=48.68 mm #(Low Gain)
Iteration 4 [Orb #4]—Utilization 52.71%, Delta=42.07 mm #(Low Gain)
Iteration 5 [Orb #1]—Utilization 54.51%, Delta=41.60 mm #(Low Gain)
. . .
Iteration 33 [Orb #1]—Utilization 55.62%, Delta=39.44 mm #(Low Gain)
Iteration 34 [Orb #2]—Utilization 45.94%, Delta=42.48 mm #(Low Gain)
Iteration 35 [Orb #3]—Utilization 57.95%, Delta=40.24 mm #(Low Gain)
Iteration 36 [Orb #4]—Utilization 54.89%, Delta=40.97 mm #(Low Gain)
Iteration 37 [Orb #1]—Utilization 55.73%, Delta=39.48 mm #(Low Gain)
Iteration 38 [Orb #2]—Utilization 45.72%, Delta=42.25 mm #(Low Gain)
Iteration 39 [Orb #3]—Utilization 57.60%, Delta=40.28 mm #(Low Gain)
Iteration 40 [Orb #4]—Utilization 54.87%, Delta=41.11 mm #(Low Gain) #Converged (static or diverging).
—41 iterations—5184.10 ms—Winner: Iteration #33
Final—Delta: 39.44 mm (7.45 mm reduction—18.89%)
Done.

- - - END OF OUTPUT LOG - - -

6. Computing System Embodiments

Figure 23:
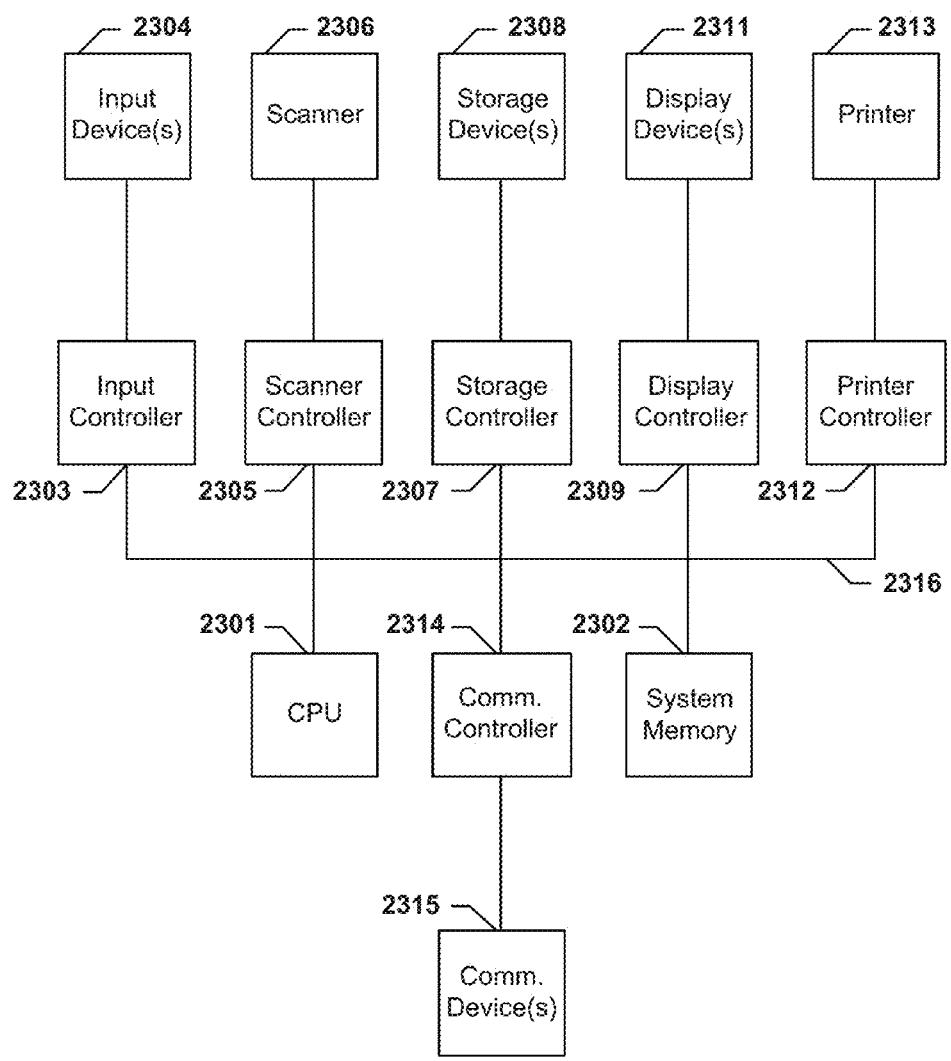
FIG. 23 depicts a block diagram illustrating an exemplary computing system which may be used to implement aspects of the present invention.

Having described the details of the invention, an exemplary system 2300, which may be used to implement one or more of the methodologies of the present invention or may operate as part of the holocam system, will now be described with reference to FIG. 23. As illustrated in FIG. 23, the system includes a central processing unit (CPU) 2301 that provides computing resources and controls the computer. The CPU 2301 may be implemented with a microprocessor or the like, and may also include a graphics processor and/or a floating point coprocessor for mathematical computations. The system 2300 may also include system memory 2302, which may be in the form of random-access memory (RAM) and read-only memory (ROM).

A number of controllers and peripheral devices may also be provided, as shown in FIG. 23. An input controller 2303 represents an interface to various input device(s) 2304, such as a keyboard, mouse, or stylus. There may also be a scanner controller 2305, which communicates with a scanner 2306. The system 2300 may also include a storage controller 2307 for interfacing with one or more storage devices 2308 each of which includes a storage medium such as magnetic tape or disk, or an optical medium that might be used to record programs of instructions for operating systems, utilities and applications which may include embodiments of programs that implement various aspects of the present invention. Storage device(s) 2308 may also be used to store processed data or data to be processed in accordance with the invention. The system 2300 may also include a display controller 2309 for providing an interface to a display device 2311, which may be a cathode ray tube (CRT), a thin film transistor (TFT) display, or other type of display. The system 2300 may also include a printer controller 2312 for communicating with a printer 2313. A communications controller 2314 may interface with one or more communication devices 2315, which enables the system 2300 to connect to remote devices through any of a variety of networks including the Internet, a local area network (LAN), a wide area network (WAN), or through any suitable electromagnetic carrier signals including infrared signals.

In the illustrated system, all major system components may connect to a bus 2316, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including magnetic tape or disk or optical disc, or a transmitter, receiver pair.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. With these implementation alternatives in mind, it is to be understood that the figures and accompanying description provide the functional information one skilled in the art would require to write program code (i.e., software) and/or to fabricate circuits (i.e., hardware) to perform the processing required.

While the inventions have been described in conjunction with several specific embodiments, it is evident to those skilled in the art that many further alternatives, modifications, application, and variations will be apparent in light of the foregoing description. Thus, the inventions described herein are intended to embrace all such alternatives, modifications, applications and variations as may fall within the spirit and scope of the appended claims.

What is claimed is:
1. A system comprising:
an acquisition module that receives visible image data and range data of a scene from two or more vantage points via one or more range data acquisition devices and one or more visible image acquisition devices;

a model creation module that produces, for a vantage point, a three-dimensional (3D) model by combining range data and visible image data from that vantage point; and a scene registration module, communicatively coupled to the model creation module, that performs scene registration to acquire geometric transformations for merging two or more 3D models of the scene from different vantage points into a source-independent canonical space;

wherein the scene registration module is configured to perform the steps comprising:

responsive to an input device having part of its sensors affected by one or more conditions in its field of view, generating an image mask for the input device to mask the affected part of its sensors;

positioning a point acquisition device within the field of view of at least two input devices;

using one or more signals from the point acquisition device to generate points which are used to find correspondences of points between data captured by at least two input devices;

using the correspondences of points to identify three-dimensional points in each of a plurality of image data of a scene; and using at least some of the identified three-dimensional points to obtain a scene registration matrix.

2. The system of claim 1 further comprising:

a runtime processor, communicatively coupled to the acquisition module, that filters the range data according to one or more filtering operations;

an audio module, communicatively coupled to the model creation module, that receive audio data about the scene from one or more audio input devices; and a transmission module, communicatively coupled to the model creation module, that encodes the scene model for transmission over a network.

3. The system of claim 2 further comprising:

a rendering module that receives an encoded scene model and renders a view of the scene using the encoded scene model for display using one or more display devices.

4. The system of claim 1 wherein the scene registration model further configured to perform the steps comprising:

performing scene reregistration to improve one or more geometric transformations.

5. The system of claim 4 wherein the scene registration module is configured to perform scene reregistration by causing the following steps to be performed:

[a] selecting as a basis a point cloud generated from data of the scene taken from a vantage point;

[b] reprojecting point clouds generated from data of the scene taken from different vantage points onto the basis and treating the aggregation of the resulting combined points clouds as one virtual point cloud;

[c] solving for rigid body movement and producing rotation (R*) and translation (T*) values;

[d] using the produced rotation (R*) and translation (T*) values to update scene registration information;

[e] responsive to a stop condition being reached, selecting a best set of scene registration information based on one or more evaluation metrics; and

[f] responsive to a stop condition not being reached, iterating by returning to step [a].

6. The system of claim 5 wherein the step of reprojecting comprises:

producing a first depth buffer filled with an identifier representing an unknown value;

for points in a point cloud obtained from one of the input devices, calculating projected pixels values using an initial transform and camera intrinsic values;

comparing the values of the projected pixels with values of corresponding pixels in the first depth buffer and setting the depth value in the first depth buffer to a projected pixel's depth value responsive to the value in the first depth buffer being (1) the unknown value or (2) larger than the corresponding projected pixel's depth value;

producing a second properly-sized depth buffer and filling it with an identifier representing an unknown value;

looping through pixel values in the first depth buffer to:

set a pixel's depth value in the second depth buffer to the value of the corresponding pixel in the first depth buffer if the value in the first depth buffer is not an unknown value; and otherwise setting the pixel's depth value to an average value of a neighborhood of values in the first depth buffer that are not unknown values, if any exist;

generating real world X and Y values using values from the second depth buffer; and combining X, Y, and Z values to produce projection points.

7. A system comprising:

an acquisition module that receives visible image data and range data of a scene from two or more vantage points via one or more range data acquisition devices and one or more visible image acquisition devices;

a model creation module that produces, for a vantage point, a three-dimensional (3D) model by combining range data and visible image data from that vantage point; and a scene registration module, communicatively coupled to the model creation module, that performs scene registration to acquire geometric transformations for merging two or more 3D models of the scene from different vantage points into a source-independent canonical space;

wherein the scene registration module is configured to perform the steps comprising:

performing point cloud generation from data about the scene taken from a vantage point;

detecting planar surfaces in the point cloud;

identifying a floor plane from among the detected planar surfaces; and estimating a canonical transformation that transforms the point cloud so that points corresponding to the floor plane are mapped to plane parallel to a z=0 plane and vertical direction is correct.

8. The system of claim 7 wherein the scene registration model is further configured to perform additional steps following the step of estimating the canonical transformation, said additional steps comprising:

performing voxel segmentation by projecting contents in the scene to the floor plane;

identifying intersections of the floor plane with potential wall planes selected from the detected planar surfaces;

using at least some of the intersections as guideline intersections to identify one or more in-plane rotation estimates between point clouds;

obtaining an in-plane translation estimate using the voxel map for reference; and for a point cloud, combining the canonical transformation, in-plane rotation, and in-plane translation to form a scene registration matrix.

9. A computer-implemented method comprising:
receiving color and depth of a scene from a plurality of vantage points from one or more input devices;
producing, for each vantage point, a three-dimensional (3D) model of data by combining depth data information and visible image data;
defining a source-independent canonical space which is used to register two or more 3D models into that space; and
performing scene registration to acquire geometrical transformations to merge two or more 3D models of the same scene from their corresponding different vantage points into a combined 3D model;
wherein the scene registration includes steps of:
performing point cloud generation from data about the scene taken from a vantage point;
detecting planar surfaces in the point cloud;
identifying a floor plane from among the detected planar surfaces; and
estimating a canonical transformation that transforms the point cloud so that points corresponding to the floor plane are mapped a plane parallel to a z=0 plane and vertical direction is correct.

10. The computer-implemented method of claim 9 wherein the scene registration includes additional steps following the step of estimating the canonical transformation, said additional steps comprises the steps of:
performing voxel segmentation by projecting contents in the scene to the floor plane;
identifying intersections of the floor plane with potential wall planes selected from the detected planar surfaces;
using at least some of the intersections as guideline intersections to identify one or more in-plane rotation estimates between point clouds;
obtaining an in-plane translation estimate using the voxel map for reference; and
for a point cloud, combining the canonical transformation, in-plane rotation, and in-plane translation to form a scene registration matrix.

11. The computer-implemented method of claim 9 wherein scene registration further comprises the step of:
performing scene reregistration to improve one or more geometric transformations.

12. A computer-implemented method comprising:
receiving color and depth of a scene from a plurality of vantage points from one or more input devices;
producing, for each vantage point, a three-dimensional (3D) model of data by combining depth data information and visible image data;
defining a source-independent canonical space which is used to register two or more 3D models into that space; and
performing scene registration to acquire geometrical transformations to merge two or more 3D models of the same scene from their corresponding different vantage points into a combined 3D model;
wherein the scene registration is user-assisted and comprises the steps of:
responsive to an input device having part of its sensors affected by one or more conditions in its field of view, generating an image mask for the input device to mask the affected part of its sensors;
positioning a point acquisition device within the field of view of at least two input devices;
using one or more signals from the point acquisition device to generate points which are used to find correspondences of points between data captured by at least two input devices;
using the correspondences of points to identify three-dimensional points in each of a plurality of image data of a scene; and
using at least some of the identified three-dimensional points to obtain a scene registration matrix.

13. A computer-implemented method comprising:
receiving color and depth of a scene from a plurality of vantage points from one or more input devices;
producing, for each vantage point, a three-dimensional (3D) model of data by combining depth data information and visible image data;
defining a source-independent canonical space which is used to register two or more 3D models into that space; and
performing scene registration to acquire geometrical transformations to merge two or more 3D models of the same scene from their corresponding different vantage points into a combined 3D model;
wherein scene registration further includes performing scene reregistration to improve one or more geometric transformations;
wherein scene reregistration comprises the step of:
[a] selecting as a basis a point cloud generated from data of the scene taken from a vantage point;
[b] reprojecting point clouds generated from data of the scene taken from different vantage points onto the basis and treating the aggregation of the resulting combined points clouds as one virtual point cloud;
[c] solving for rigid body movement and producing rotation (R*) and translation (T*) values;
[d] using the produced rotation (R*) and translation (T*) values to update scene registration information;
[e] responsive to a stop condition being reached, selecting a best set of scene registration information based on one or more evaluation metrics; and
[f] responsive to a stop condition not being reached, iterating by returning to step [a].

14. The computer-implemented method of claim 13 wherein the step of reprojecting comprises:
producing a first depth buffer filled with an identifier representing an unknown value;
for points in a point cloud obtained from one of the input devices, calculating projected pixels values using an initial transform and camera intrinsic values;
comparing the values of the projected pixels with values of corresponding pixels in the first depth buffer and setting the depth value in the first depth buffer to a projected pixel's depth value responsive to the value in the first depth buffer being (1) the unknown value or (2) larger than the corresponding projected pixel's depth value;
producing a second properly-sized depth buffer and filling it with an identifier representing an unknown value;
looping through pixel values in the first depth buffer to:
set a pixel's depth value in the second depth buffer to the value of the corresponding pixel in the first depth buffer if the value in the first depth buffer is not an unknown value; and
otherwise setting the pixel's depth value to an average value of a neighborhood of values in the first depth buffer that are not unknown values, if any exist;
generating real world X and Y values using values from the second depth buffer; and combining X, Y, and Z values to produce projection points.

15. The computer-implemented method of claim 13 wherein the step of solving for rigid body movement and producing rotation (R*) and translation (T*) values comprises the steps of:
given two point clouds, $P_1$ and $P_2$, and scene registration information comprising rotation and translation values, projecting $P_1$ and $P_2$ to produce $P_1^*$;
noting corresponding pair of points between $P_1^*$ and $P_2$ which are less than a threshold distance apart;
utilizing a rigid body movement transformation to produce an estimate of the rotation R* and translation T* values; and
update the rotation and translation values.

16. A system comprising
one or more processors; and
a non-transitory computer-readable medium or media comprising one or more sequences of instructions which, when executed by the one or more processors, causes steps to be performed comprising:
receiving color and depth of a scene from a plurality of vantage points from one or more input devices;
producing, for each vantage point, a three-dimensional (3D) model of data by combining depth data information and visible image data;
defining a source-independent canonical space which is used to register two or more 3D models into that space; and
performing scene registration to acquire geometrical transformations to merge two or more 3D models of the same scene from their corresponding different vantage points into a combined 3D model;
wherein scene registration comprises the steps of:
performing point cloud generation from data about the scene taken from a vantage point;
detecting planar surfaces in the point cloud;
identifying a floor plane from among the detected planar surfaces;
estimating a canonical transformation that transforms the point cloud so that points corresponding to the floor plane are mapped to a plane parallel to a z=0 plane and vertical direction is correct.

17. The system of claim 16 wherein scene registration includes additional steps following the step of estimating the canonical transformation, said additional steps comprises the steps of:
performing voxel segmentation by projecting contents in the scene to the floor plane;
identifying intersections of the floor plane with potential wall planes selected from the detected planar surfaces;
using at least some of the intersections as guideline intersections to identify one or more in-plane rotation estimates between point clouds;
obtaining an in-plane translation estimate using the voxel map for reference; and
for a point cloud, combining the canonical transformation, in-plane rotation, and in-plane translation to form a scene registration matrix.

18. The system of claim 16 wherein the scene registration further comprises the step of:
performing scene reregistration to improve one or more geometric transformations.

19. A system comprising
one or more processors; and
a non-transitory computer-readable medium or media comprising one or more sequences of instructions which when executed by the one or more processors, causes steps to be performed comprising:
receiving color and depth of a scene from a plurality of vantage points from one or more input devices;
producing, for each vantage point, a three-dimensional (3D) model of data by combining depth data information and visible image data;
defining a source-independent canonical space which is used to register two or more 3D models into that space; and
performing scene registration to acquire geometrical transformations to merge two or more 3D models of the same scene from their corresponding different vantage points into a combined 3D model;
wherein the scene registration includes a step of performing scene reregistration to improve one or more geometric transformations;
wherein scene reregistration comprises the step of:
[a] selecting as a basis a point cloud generated from data of the scene taken from a vantage point;
[b] reprojecting point clouds generated from data of the scene taken from different vantage points onto the basis and treating the aggregation of the resulting combined points clouds as one virtual point cloud;
[c] solving for rigid body movement and producing rotation (R*) and translation (T*) values;
[d] using the produced rotation (R*) and translation (T*) values to update scene registration information;
[e] responsive to a stop condition being reached, selecting a best set of scene registration information based on one or more evaluation metrics; and
[f] responsive to a stop condition not being reached, iterating by returning to step [a].

20. The system of claim 19 wherein the step of reprojecting comprises:
producing a first depth buffer filled with an identifier representing an unknown value;
for points in a point cloud obtained from one of the input devices, calculating projected pixels values using an initial transform and camera intrinsic values;
comparing the values of the projected pixels with values of corresponding pixels in the first depth buffer and setting the depth value in the first depth buffer to a projected pixel's depth value responsive to the value in the first depth buffer being (1) the unknown value or (2) larger than the corresponding projected pixel's depth value;
producing a second properly-sized depth buffer and filling it with an identifier representing an unknown value;
looping through pixel values in the first depth buffer to:
set a pixel's depth value in the second depth buffer to the value of the corresponding pixel in the first depth buffer if the value in the first depth buffer is not an unknown value; and
otherwise setting the pixel's depth value to an average value of a neighborhood of values in the first depth buffer that are not unknown values, if any exist;
generating real world X and Y values using values from the second depth buffer; and
combining X, Y, and Z values to produce projection points.

* * * * *